United States Patent
Wang et al.

(10) Patent No.: US 7,072,825 B2
(45) Date of Patent: Jul. 4, 2006

(54) HIERARCHICAL, NETWORK-BASED EMULATION SYSTEM

(75) Inventors: Ming Yang Wang, LaFayette, CA (US); Sweyyan Shei, Cupertino, CA (US); Vincent Chiu, Fremont, CA (US)

(73) Assignee: Fortelink, Inc., Fremont, CA (US)

( * ) Notice: Subject to any disclaimer, the term of this patent is extended or adjusted under 35 U.S.C. 154(b) by 342 days.

(21) Appl. No.: 10/463,057

(22) Filed: Jun. 16, 2003

(65) Prior Publication Data

US 2004/0254779 A1 Dec. 16, 2004

(51) Int. Cl.
*G06F 17/50* (2006.01)
*G06F 9/44* (2006.01)

(52) U.S. Cl. .................. 703/28; 703/21; 716/4
(58) Field of Classification Search .............. 703/21, 703/28; 716/4
See application file for complete search history.

(56) References Cited

U.S. PATENT DOCUMENTS

| 5,634,003 | A | 5/1997 | Saitoh et al. |
| 5,838,908 | A | 11/1998 | Matzke et al. |
| 6,377,911 | B1 | 4/2002 | Sample et al. |
| 6,754,763 | B1 * | 6/2004 | Lin ........................... 710/317 |
| 2003/0144828 | A1 | 7/2003 | Lin |
| 2003/0182641 | A1 | 9/2003 | Yang |

* cited by examiner

Primary Examiner—Hugh Jones
(74) Attorney, Agent, or Firm—Daniel J. Bedell; Smith-Hill and Bedell

(57) ABSTRACT

An apparatus for emulating the behavior of an electronic device under test (DUT) includes a computer and one or more resource boards containing emulation resources suitable for emulating portions of the DUT. Each resource board includes transaction device for communicating with one another and with the computer network via data packets transmitted over a packet routing network. The packet routing network and the transaction device on each resource board provide "virtual signal paths" between input and output terminals of resources mounted on separate resource boards. To do so, a transaction device on one resource board sends packets containing data indicating output signal states of local emulation resources to a transaction device on another resource board when then drives signals supplied to input terminals of its local emulation resources to the states indicated by the data conveyed in the packet. When the workstation is to emulate a portion of the DUT, the packet routing network also provides virtual signal paths between the workstation and the resource boards. The computer also transmits programming data to the emulation resources via the packet routing network.

69 Claims, 9 Drawing Sheets

HIERARCHICAL, NETWORK-BASED EMULATION SYSTEM

BACKGROUND OF THE INVENTION

1. Field of the Invention

The present invention relates to emulation systems employing programming logic devices and other resources for emulating the behavior of an electronic circuit, and in particular to a hierarchical emulation system in which emulation resources communicate with one another via packets sent through a packet routing network.

2. Description of Related Art

A typical digital integrated circuit (IC) employs register transfer logic (RTL) wherein each block of logic within the IC includes an output register for synchronizing state changes in its output signals to edges of a clock signal. Typically a designer will first generate an RTL level, hardware description language (HDL) netlist employing Boolean expressions to characterize each block of logic, and will then employ a synthesis tool to convert the high level netlist into a gate level HDL netlist describing the logic blocks as sets of interconnected cells, where each cell is a standard IC component such as a transistor or a logic gate. The gate level netlist references each cell instance to be included in the IC by referring to an entry for that cell type in a cell library, a database including an entry for each kind of cell that can be included in an IC. The cell library entry for each cell type includes a model of the cell's behavior that circuit simulation and verification tools can employ. After creating the gate level netlist, the designer employs a placement and routing (P&R) tool to convert the gate level netlist into an IC layout file indicating the position and layout within a semiconductor die of each cell forming the IC and describing how the nets are to be routed between cell terminals. The layout file guides fabrication of the IC.

An IC designer usually employs computer-aided simulation and verification tools at each step of the design process to verify that the IC will behave as expected. To do so, the designer may develop a "testbench" for a computer-based circuit simulator incorporating the netlist describing the IC "device under test" (DUT) to be simulated and indicating how the DUT's input signals are to change state over time. The testbench will also list various signals of the DUT to be monitored during the simulation including test signals and signals the DUT generates in response to the test signals. The simulator creates a behavioral model of the DUT based on the testbench description of the DUT and on-behavioral models of the DUT's cells obtained from the cell library and then tests the DUT model to determine how the monitored signals would respond to input signal patterns the testbench describes. During the test, the simulator generates a "dump file" containing waveform data representing the time-varying behavior of the monitored signals. The designer can then use various debugging tools to inspect the dump file to determine whether the DUT behaved as expected.

Although a simulator can accurately model the behavior of an IC based on either an RTL level or gate level netlist, it can require much processing time to simulate IC behavior. To reduce simulation time a designer can program a simulator to simulate only those portions of an IC design that are new or have been modified, but this approach may not provide any assurance that the new and old portions of the design will work properly together.

One way to reduce the time needed to verify the DUT logic a netlist describes is to use programmable logic devices to emulate the DUT logic. For example U.S. Pat. No. 6,377,911 issued Apr. 23, 2002 to Sample et al, describes a logic emulation system employing field programmable gate arrays ("FPGAs") that can be programmed to emulate DUT logic. Since the FPGAs employ logic gates rather than software to emulate circuits, emulation using FPGAs can be much quicker than simulation.

FIG. 1 illustrates a typical prior art emulation system 10 including a set of circuit boards 12 each holding an array of FPGAs 14, each of which can be programmed to emulate the logic of a large number of interconnected logic gates, flip-flops and registers. Each FPGA 14 has many I/O terminals and some of those I/O terminals are linked to I/O terminals of other FPGAs 14 on the same circuit board 12 so that the FPGAs can communicate with one another. Circuit boards 12 reside in slots on a motherboard 15 including a backplane for interconnecting I/O terminals of FPGAs 14 residing on different circuit boards 12 so that they too can communicate with one another. In some systems the signal paths between FPGAs or FPGA boards are linked via programmable routing devices such as crosspoint switches to provide more flexible signal routing between FPGAs. A conventional workstation 16 processes the user's netlist description of the DUT to produce a set of instructions for programming FPGAs 14 to emulate DUT logic and transmits those instructions to programming inputs of FPGA 14 via one or more input/output (I/O) interface cards 17 installed in a slot of the PCI bus of workstation 16. Each I/O interface card 17 is capable of transmitting signals to and receiving signals from resources mounted on motherboard 15 via signal paths motherboard 15 provides.

In addition to logic FPGAs 14 can emulate, ICs may include large standardized components such embedded computer processors and memories that can be emulated by processors or memory ICs mounted on "resource boards" 18 that may also be installed in slots of motherboard 15. Backplane wiring on motherboard 15 links terminals of the devices mounted on resource boards 18 to I/O terminals of various FPGAs 14 mounted on FPGA boards 12.

A designer normally intends an IC to be installed on a circuit board of an external system so that it can communicate with other devices within that system. When emulator 10 is to act as an in-circuit emulation ("ICE") system, the emulator includes an external system interface circuit 22 providing signal paths between I/O terminals of FPGAs 14 and a socket of the external system 24 of the type in which the IC being emulated will eventually reside. A cable 27 interconnects interface 22 with external system 24 and typically includes a connector that fits into the IC socket.

Emulation system 10 may also include pattern generation and data acquisition circuits 26 mounted on circuit boards installed in motherboard 15 and linked through signals paths on the motherboard to I/O terminals of FPGAs 14. These circuits supply input signals to the FPGAs and monitor selected FPGA output signals during the emulation process to acquire "probe data" representing the behavior of the DUT output signals. Following the emulation process, a user may employ debugging software to analyze the probe data to determine whether the DUT will behave as expected.

FIG. 2 illustrates an alternative prior art emulator architecture 20 wherein resource cards 28 mounted in slots accessing the memory bus of a workstation 33 emulation some portions of a DUT while workstation 33 emulates other portions of the DUT. Each card 28 includes an array of interconnected FPGAs 14 and may include other resources 30 such as memories linked to I/O terminals of FPGAs 14. An I/O interface circuit 32 in each card 28 includes I/O terminals connected to many I/O terminals of FPGAs 14.

Workstation 33 sends instructions via its PCI bus to an I/O interface circuit 32 on each card 28 telling it how to configure FPGAs for to emulate circuit logic.

As mentioned above, a testbench is a program for a circuit simulator describing an IC device under test (DUT) also describes the test signal inputs to the DUT and indicates which of the DUT's input and output signals are to be monitored. FIG. 18 is a conceptual block diagram illustrating how an emulation system would implement the various functions of a testbench including a generator 34, a transactor 35, the DUT 36 and a monitor 37. FPGAs programmed and interconnected to emulate an IC described by a netlist typically form the emulated DUT 36. The "generator" 34 is relatively high level software code that the IC designer writes to describe the test signals to be supplied as input to DUT 36. For example a portion of generator code might appear as follows:
write location1 data1

The word "write" is a command indicating the value of a variable data1 is to be written to DUT input terminal (s) a variable location1 identifies. The IC designer would typically write this line of code. "Transactor" 35 is the equipment needed to implement the generator's high-level commands. For example the transactor 35 would respond to the write command by setting an input signal or signals at the DUT input identified by "locations" to the value of "data1". "Monitor" 37 is the equipment needed to monitor DUT input and output signals during the emulation.

While emulators typically use FPGAs and other hardware to emulate DUT 36, they may use either of two approaches to handling the functions of generator 34, transactor 35 and monitor 37. In the emulation system 10 of FIG. 1, specialized pattern generation and data acquisition circuits 26 that may or may not reside on motherboard 15 can carry out all of these testing functions, and it is necessary to program these devices to supply test signal patterns as inputs to DUT 36 and to monitor DUT output signals by sampling them at appropriate times during the emulation process and storing data representing the DUT output signal states. One difficulty with this approach, in addition to requiring specialized test equipment 26, is that it is necessary to translate the portions of the testbench relating to generator 34 and monitor 37 into program instructions for the test equipment.

In the emulation system 20 of FIG. 2, workstation 33 and I/O interface devices 32 carry out all of the functions of generator 34, transactor 35 and monitor 37. Software running on workstation entirely implements generator 34. Software running on workstation 33 and I/O interface devices 32 jointly implement transactor 35 and monitor 37. This approach avoids the need to program specialized test equipment, but will normally require a reduction in the frequency at which DUT 36 can operate during the emulation because workstation 33 typically will not be able to communicate with the DUT 36 via I/O interface circuit 32 at sufficiently high signal frequencies.

One additional drawback to both emulation systems 10 and 20 is that they are not highly scalable since the number of slots in motherboard 15 and the number of bus slots in workstation 16 limit the number of FPGAs and other resources they can provide.

BRIEF SUMMARY OF THE INVENTION

A circuit designer typically creates a hardware description language (HDL) testbench describing an electronic circuit device to be tested, describing the behavior of the test signals to be supplied as inputs to the device under test (DUT), and also identifying a plurality of probe points within the DUT at which behavior of output signals produced by the DUT is to be determined. The invention relates to a system for emulating the behavior of the DUT the testbench describes and for emulating test equipment supplying test signals to the DUT and monitoring the DUT s probe points.

An emulation system in accordance with the invention includes at least one workstation computer and one or more resource boards, each containing emulation resources suitable for emulating portions of the DUT. Emulation resources on each board may include, for example, field programmable gate arrays (FPGA) or other types of programmable logic devices (PLDs) and/or other resources such as memories. Each resource board provides signal paths between the resources mounted on that board so that the resources can communicate with one another.

In accordance with one aspect of the invention, a packet routing network interconnects the workstation and the resource boards. Each resource board includes a "transaction device" acting as an interface between the network and the resources mounted on the resource board. Each transaction device transmits and receives packets via the network and communicates with the emulation resources on that board through signal paths between the resources and the transaction device. The packet routing network and the transaction devices mounted on the resource boards provide "virtual signal paths" between input and output terminals of resources mounted on separate resource boards. For example, a transaction device of one resource board can monitor output signals of a local emulation resource and send packets containing data indicating the states of those output signals to a transaction device of another resource board. The receiving transaction device can then drive signals supplied to input terminals of resources mounted on its local resources board to states indicated by the data conveyed in the packet. Although the input and output terminals of the resources mounted on separate resource boards are not directly interconnected by signal paths, the virtual signal paths allow them to act as if they were. When the workstation is to emulate a portion of the DUT, the packet routing network can also provide virtual signal paths between the workstation and the resource boards. The packet routing network and the transaction device mounted on each resource board also allow the workstation to send programming data via packets to the programmable logic devices mounted on each board.

Thus an emulation system in accordance with the invention avoids having to provide hard-wired signal paths directly between terminals of resources mounted on separate resource boards. With the packet routing network providing virtual signal paths between resource boards, it is necessary only to connect the boards to the network using conventional network cables in order to allow any resource mounted on any one resource board to communicate with any resource mounted on any other resource board. Conventional network switching devices such as routers and hubs can be flexibly arranged to provide the necessary bandwidth between resource boards. The network connection between resources boards thus renders the emulation system highly scalable.

An emulation system in accordance with the invention also simplifies the programming effort needed to allow different kinds of emulation resources to interact with one another since all resources can communicate using a standardized network communication protocol. Since the transaction devices handle all of the low level work of directly communicating with each resource in a manner that is appropriate to that particular resource, by sending only high level memory read or write instructions to a transaction device, a workstation can in one instruction cycle initiate a transaction with a resource what would otherwise require the workstation many instruction cycles to accomplish if it had to directly control the transaction through a low-level I/O interface. Thus the transaction devices allow the emulation to operate higher clock frequencies than in prior art emulation systems wherein workstations directly control or monitor DUT input and output signals via conventional low-level I/O interfaces.

The claims appended to this specification particularly point out and distinctly claim the subject matter of the invention. However those skilled in the art will best understand both the organization and method of operation of what the applicants consider to be the best modes of practicing the invention, together with further advantages and objects of the invention, by reading the remaining portions of the specification in view of the accompanying drawings wherein like reference characters refer to like elements.

DETAILED DESCRIPTION OF THE INVENTION

Figure 1:
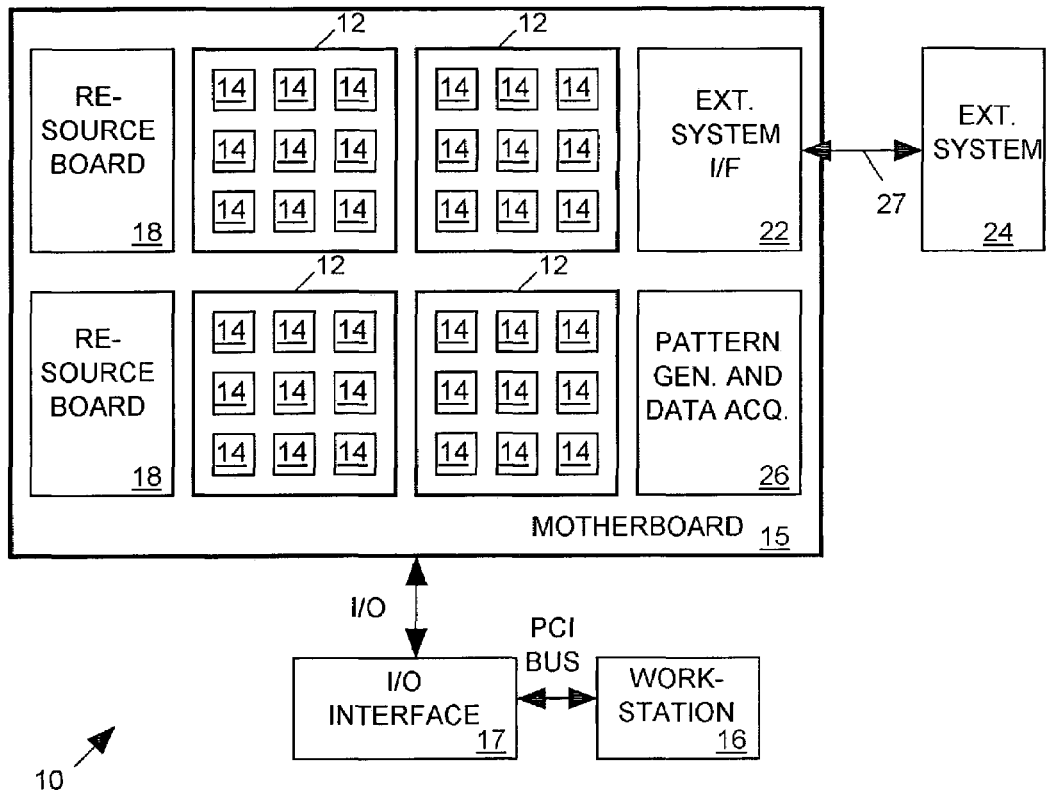
FIGS. 1 and 2 illustrate prior art emulation systems in block diagram form.
Figure 2:
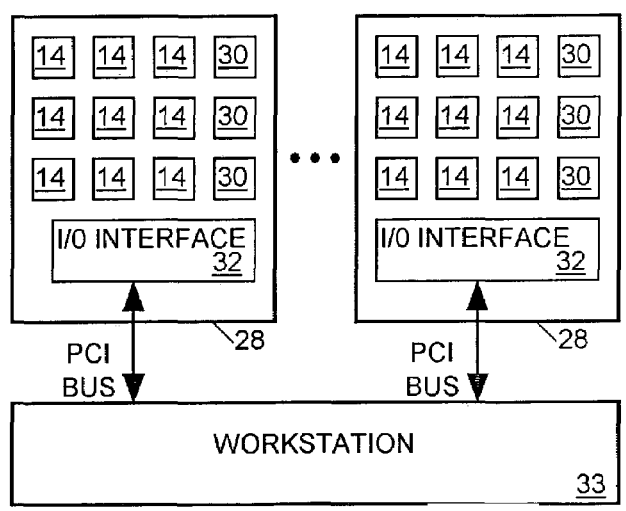

A circuit designer typically generates a conventional hardware description language (HDL) "testbench" including a netlist description of an electronic device such as an IC or a portion of an IC to be tested. The testbench also describes a time-varying behavior of test signals to be applied to inputs of the electronic device under test (DUT), and identifies various "probe points" within the circuit at which the DUT produces signals to be monitored. The present invention relates to a network-based emulation system using various programmable resources to emulate the behavior of a DUT to determine how signals the DUT produces at the probe points would behave in response to test signals applied as inputs to the DUT. The specification below and the accompanying drawings depict an example embodiment of the invention recited in the appended claims considered to be a best mode of practicing the invention. However the claims are intended to apply not only to the example embodiment described below but to any mode of practicing the invention comprising the combination of elements or steps as described in the claims, including elements or steps that are functional equivalents of the example elements or steps of the exemplary embodiment of the invention depicted in the specification and drawings.

An emulation system in accordance with the invention may employ a mix of hardware and software-based emulation resources to emulate portions of a DUT a testbench describes, to generate test signal inputs to the emulated DUT, and to acquire data representing the behavior of the response signals appearing at the probe points of the emulated DUT. The emulation system processes the testbench to determine which of its emulation resources to employ to emulate each portion of the DUT, to determine which resources will generate the test signals and which resources will monitor the emulated DUT's output signals. The emulation system then appropriately programs each emulation resource to carry out it assigned function.

The invention relates in particular to a manner in which the emulation resources communicate with one another and with a workstation that programs the resources and that may itself emulate a portion of the DUT. Various modules of a real DUT directly communicate with one another through signal paths directly interconnecting the modules. However in accordance with the invention when emulation resources programmed to emulate the behavior of separate modules of a DUT reside on separate circuit boards ("resource boards"), they need not directly communicate with one another through real, hard-wired signal paths. Instead they can communicate with one another through "virtual signal paths" implemented by "transaction devices" mounted on the resource boards that transmit data packets to one another via a packet routing network. Each transaction device communicates with the resources on that board through hard-wired signal paths, but the transaction devices communicate with each other and with the workstation through data packets transmitted via the packet routing network.

Each transaction device can be programmed to carry out one or more transactions relative to the resources mounted on the local resource board in response to commands and data conveyed by the packets it receives from the work station or other transaction devices and each transaction device can also send packets conveying commands and data to the workstation or other transaction devices.

Assume for example that some output signals of resource A are to act as input signals to resource B and that resources A and B reside on different resource boards. A transaction device for resource A may be programmed to monitor those resource A output signals and periodically send a packet containing data indicating the states of those output signals to the transaction device for resource B via the packet routing network. Each resource has a unique network address and although the transaction devices, and not the resources themselves, transmit and receive the packet, the packet contains a network destination address identifying resource B as the packet "destination" and a source address identifying resource A as the packet "source". A transaction device residing on the resource board containing resource B accepts the incoming packet when it determines from the destination address in the packet that the resource to which the packet is addressed resides on the local resource board. The transaction device then responds to a command included in the packet's header by driving the input signals of resource B to the states indicated by signal data included as the packet's payload data.

The transaction device for resource A could be programmed, for example, to transmit a packet on each pulse of a system clock signal that clocks logic operation in resource A so that the resource B input signal states are updated whenever the output signals of resource A change state. Thus the interface circuits and the packet routing network can act as "virtual signal paths" between output terminals of resource A and input terminals of resource B. While there is no direct signal path between them, they behave as if there were.

In an emulation system in accordance with the invention, each input, each output and each internal storage location of each emulation resource that is accessible to a transaction device is mapped to unique address within a common memory address space. When emulation software running on the workstation wants to drive an emulation resource input to a particular state or wants to write data to a particular storage location of an emulation resource, it need only execute a conventional memory write statement which writes data to the memory address associated with that particular resource input or storage location. Low-level "transactor" software also running on the workstation responds to the write statement by transmitting a packet addressed to the resource containing a write command and data indicating the input or storage location to be accessed and the state to which the input is to be driven or the data to be written to the storage location. The transaction device connected to that resource responds to the command and data conveyed in the packet by driving the particular resource input to the desired state or by writing the data to the particular storage location of that resource. Conversely, when the emulation software running on the workstation wants to sample the state of a particular emulation resource output or wants to read data stored at a particular storage location of the emulation resource, it need only execute a conventional memory read statement which reads data from the memory address associated with that particular resource output or storage location. The low-level transactor software running on the workstation responds to the read statement by transmitting a packet addressed to the resource containing a read command and data indicating the output or storage location to be accessed. The transaction device connected to that resource responds to the read command and data conveyed in the packet by determining the state of the particular resource input or by reading the data stored at the particular storage location of that resource and then returning a packet to the workstation containing the data that is to be returned to the emulation software. The transactor software in the workstation receives the packet and returns the data it conveys to the emulation software in response to the read command.

One advantage to this network-based communication system is that it avoids the need to provide hard-wired signal paths between resources mounted on separate resource boards. With a suitable transaction device provided on each resource board for accessing input and output signals of the resources on that resource board, and with all transaction devices interconnected through the same packet routing network, any resource mounted on any one resource board can communicate with any resource mounted on any other board through virtual signal paths.

Another advantage of the network-based communication system is that it makes it relatively easy to use one or more conventional computers as resources for emulating certain portions of the DUT being emulated since conventional computers can be easily connected to a network. The signal paths between the portion of the DUT being emulated by a computer and other portions of the DUT being emulated by the resource boards are themselves emulated by virtual signal paths.

A further advantage to the network-based communication system is that it renders the emulation system highly scalable. To add more resource boards or computers to the emulation system, it is necessary only to extend the packet routing network to the new resource boards or computers. Prior art emulation systems that rely on hard-wired or switch-based systems to provide direct signal paths between resource boards mounted, for example, in a motherboard are of limited scalability due to the limited number of available slots in the motherboard.

The network-based communication system also makes it easier to program a computer emulating a portion of a DUT to interact with other emulation resources. Since the transaction devices and low-level transactor software running on the workstation handle all of the low-level work of directly communicating with each resource in a manner that is appropriate to that particular resource, software in a workstation emulating any part of a testbench and can interact with any other part of the emulation system simply by writing and reading to particular memory addresses. Thus the emulation software can with one instruction initiate a transaction with a resource what would otherwise require many instructions to accomplish if the emulation software had to directly control the transaction through a low-level I/O interface. The transaction devices therefore allow the emulation to be carried out at higher clock frequencies than in prior art emulation systems wherein workstations directly control or monitor DUT input and output signals via conventional low-level I/O interfaces.

EXAMPLE IMPLEMENTATION

Figure 3:
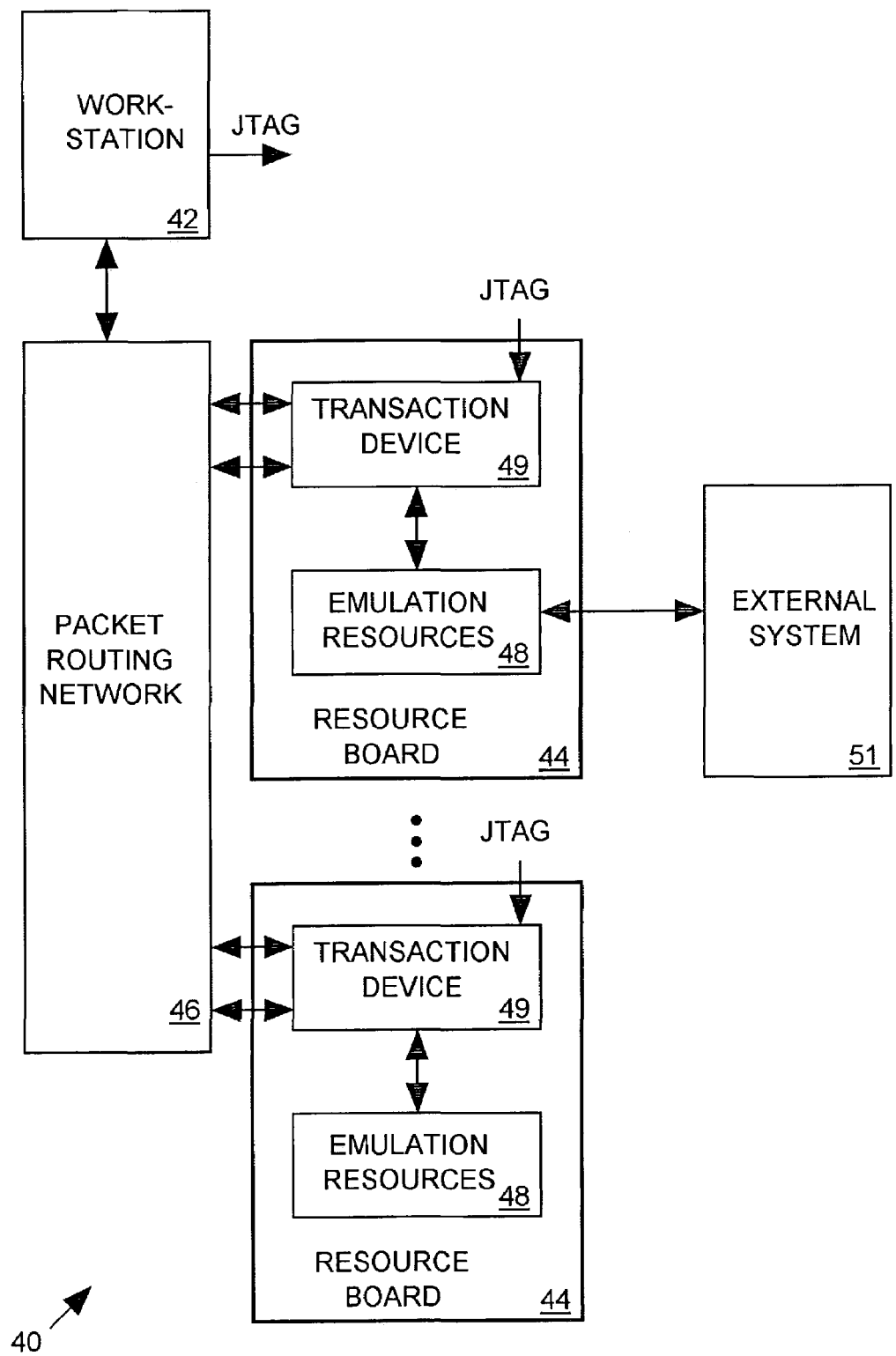
FIG. 3 illustrates an example network-based emulation system in accordance with the invention.

FIG. 3 illustrates an example of an emulation system 40 in accordance with the invention including a computer workstation 42, one or more resource boards 44, and a packet routing network 46 comprising one or more buses that may be interconnected by conventional network routers, switches or hubs. Each resource board 44 includes one or more emulation resource 48 such as a programmable gate array (FPGA) or any other type of programmable logic device (PLD), a random access or read only memory, an application specific integrated circuit (ASIC), a microprocessor, or any other kind of device that could be used to emulate the behavior of any portion of an DUT at some level of abstraction. Each resource board 44 also includes a transaction device 49 for providing an interface between packet routing network 46 and emulation resources 48.

Packet routing network 46 may be implemented, for example, as a standard IEEE 1394 "firewire" bus network and in such case each transaction device 49 is adapted to transmit and receive packets via using standard firewire bus protocol. But the invention is not limited to employing firewire bus protocol; many network systems and protocols known to those of skill in the art may be used in lieu of a firewire bus to convey data packets between I/O circuits 52.

The workstation or any transaction device 49 may assemble and send a packet outward via packet routing network 46. Packet routing network 46 may forward the outgoing packet to workstation 42 and the transaction device 49 of every resource board 44, or when it has network routing capability, the network may more selectively forward the outgoing packet based on a network destination address included in the packet. Each packet is arranged in accordance with the particular physical layer protocol the network uses, but each packet will typically include in addition to payload data, a header containing information the network needs to route the packet. Workstation 42, each transaction device 49, and each emulation resource 48 has a unique network address, and the header included in each data packet transmitted via packet routing network 46 suitably indicates the network addresses of the devices designated as the source and destination of the packet. 42. The header also includes a command telling the recipient transaction device or workstation to carry out an action. The payload data a packet conveys may be of fixed or variable length depending on the nature of the network's physical layer protocol, though variable length packets are preferable. The payload data includes any data to be used as an argument to the command included in the header. For example, if the command tells a receiving transaction device 49 to drive input signals of a particular emulation resource 48 the packet's destination address identifies to particular states, then the payload constituting the command's argument will reference the signals and indicate the states to which they are to be driven. The transaction device 49 will execute the command in an incoming packet only if the network destination address included in the packet header matches the address of any emulation resource 48 on the local resource board 44.

The transaction device 49 of each resource board 44 is designed not only to transmit and receive packets but may also to communicate with the local emulation resources 48 on that resource board using communication protocols that are appropriate to those resources. Since the types of transactions each transaction device 49 carries out depends on what the local emulation resources 44 are programmed to do, the transaction device 49 is suitably implemented at least in part by one or more programmable logic devices that can be initially programmed, for example, by programming data supplied from an external source through a JTAG or other type of bus and thereafter by programming data conveyed by incoming packets addressed to transaction device 49.

Packets can convey in their payloads data for programming emulation resources 48 such as FPGAs. To program an FPGA, workstation 42 addresses a packet conveying a "download" command and FPGA programming data to the particular FPGA to be programmed. The transaction device 49 on the resource board 44 containing the addressed FPGA is programmed to respond to the download command in the incoming packet by forwarding the packet's payload programming data to the programming input of the addressed FPGA.

A packet may convey data indicating current states of resource output signals or indicating state to which resource input signals are to be driven. For example a "read" command in an incoming packet can tell a transaction device 49 to return a signal data packet to the source address containing payload data indicating states of signals at various I/O terminals of an FPGA addressed by the incoming packet's destination address. A "force" command in a packet can tell a receiving transaction device 49 to drive input terminals of an emulation resource addressed by the packet's destination address to states indicated data conveyed in the packet. A sequence of packets containing force commands can emulate the behavior of signal paths between output terminals of emulation resources 48 on the resource board 44 sending the packets and input terminals of emulation resources 48 on another resource board to which the packets are addressed. In a "co-validation mode of operation", workstation 42 (or any other computer that may be connected to packet routing network 46) can emulate some portions of an IC while emulation resources 48 on resource boards 44 emulate other portions of the IC. In that mode of operation, workstation 42 and transaction devices 49 can use packets conveying force commands to drive signal inputs to resources within various modules.

A resource board 44 may include a large amount of random access memory that can, for example, emulate the function of a large memory bank. In such case, a command conveyed in an incoming packet's header might tell transaction device 49 to write data to a particular address or a block of addresses within one of the RAMs selected by the packet's destination address. In such case the argument data included in the packet's data payload may include the RAM address to be accessed as well as the data to be written to that RAM address. A memory read command in an incoming packet tells a transaction device 49 to read data at a particular address or block of addresses of a RAM addressed by the destination address and to return the data read out of the RAM in a packet addressed to the device identified by the source address included in the incoming packet's header.

Emulation system 40 can act as an in-circuit emulator (ICE) emulating an IC in its intended operating environment, within an external system 51 such as a circuit board containing other components. In the ICE operation mode emulation resources 48 communicate directly with external system 51, for example, through signal paths provided by a cable connector 53 that plugs into a socket within external system 51 that normally holds the IC being emulated.

EXAMPLE FPGA RESOURCE BOARD

Figure 4:
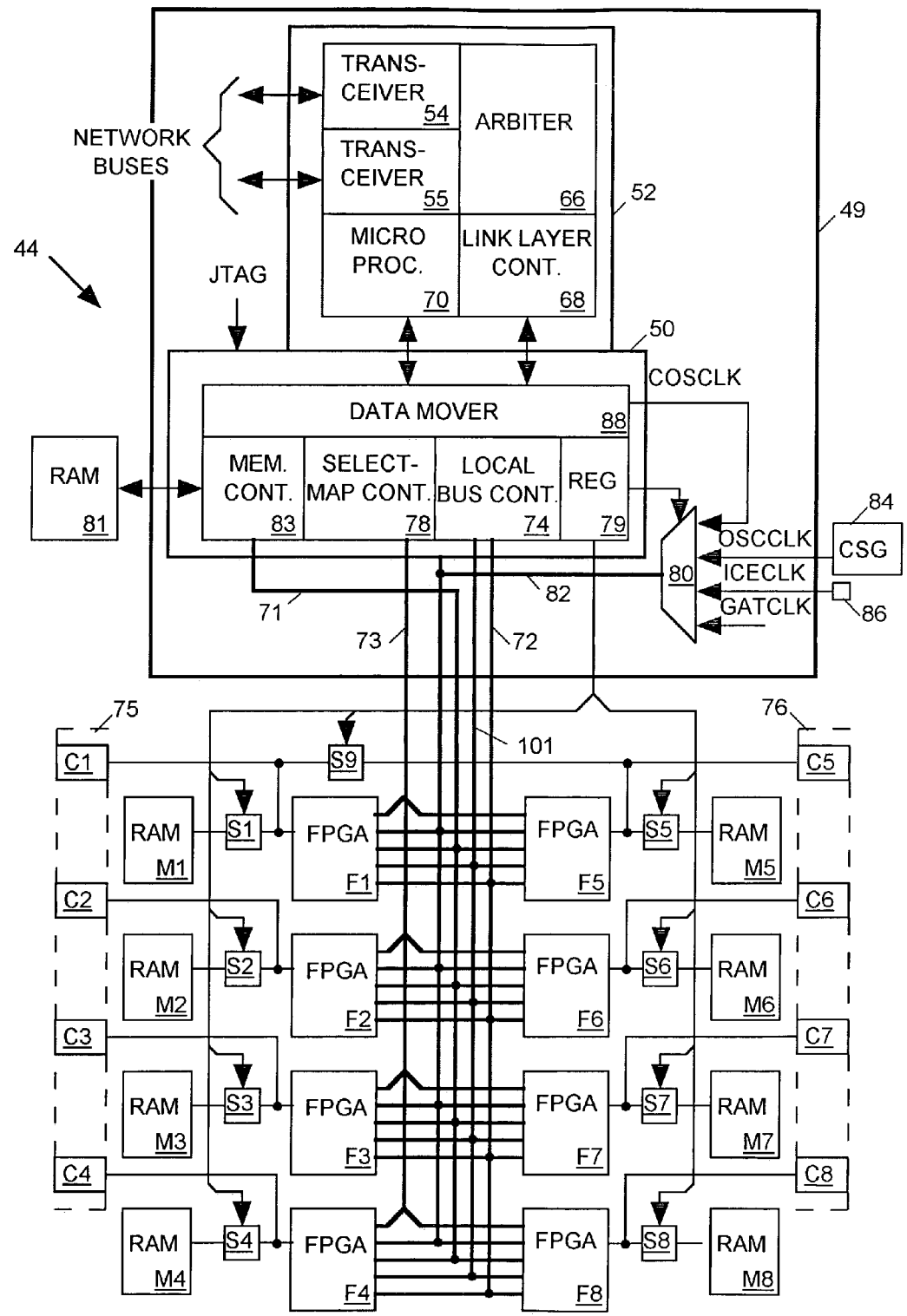
FIG. 4 illustrates an example resource board of the emulation system of FIG. 3 in more detailed block diagram form.

FIG. 4 illustrates an example of one type of resource board 44 of FIG. 3 in more detailed block diagram form. The example resource board 44 includes a transaction device circuit 49 formed by an I/O block 52 and a resource controller 50. I/O block 52 includes a pair of transceivers 54 and 55 for transmitting and receiving packets via networks 46 of FIG. 3. Each transceiver 54 and 55 decodes an incoming signal arriving on a separate port to recover the packet it conveys and then passes the packet in the form of, for example, a sequence of 8-bit bytes to a link layer circuit 68 via an arbiter 66. Byte sizes other than 8-bit may be used in other implementations. When the packet is addressed to a resource on the local board, link layer circuit 68 forwards the information contained in the packet to resource controller 50. Resource controller 50 then carries out the activity the command in the packet references.

When resource controller 50 wants to send data outward via a packet, it forwards the data to link layer controller 68. Link layer controller 68 incorporates the data into a packet and forwards the packet in the form of a byte sequence to one of transceivers 54 and 55 via bus arbiter 66. The transceiver 54 or 55 then encodes the packet into a signal transmitted outward via one of networks 46. I/O block 52 also includes a microcomputer 70 for controlling handshaking between resource controller 50 and link layer controller 68 and for generating the headers for outgoing packets.

During system start up microcomputer 70 communicates with workstation 42 to establish a unique address for each local emulation resource. Microcomputer 70 may also be programmed to carry out other functions as described below.

Transceivers 54 and 55 and arbiter 66 are suitably implemented, for example, by a Texas Instruments (TI) model TSB 41AB03A physical layer IC, link layer controller 68 is suitably implemented, for example, by a TI model TSB12LV32 link layer IC, and microcomputer 70 is suitably implemented by a Motorola model Mcore MMC2107 microcontroller IC. However other types of ICs can carry out the function of I/O block 52 in other ways since the internal organization of I/O block 52 is a matter of design choice and depends on the type of packet routing network employed.

In the example resource board 44 of FIG. 4, emulation resources include an array of eight FPGAs F1–F8, each for example an Xilinx model Virtex-II 6000 FF1517 having approximately 1100 I/O pins and providing up to 400K gates, although other FPGA makes and models and be used. Though not shown in FIG. 4, 120 of the I/O terminals of each FPGA F1–F8 are directly linked to I/O terminals of each one of the other FPGA. Thus 840 I/O pins of each FPGA F1–F8 are used for interconnecting that FPGA to each of the seven other FPGAs on the same resource board 44 so that they can communicate with one another. Another 42 I/O pins of each FPGA F1–F8 are linked through a parallel local bus 72 to a local bus controller 74 implemented within resource controller 50. These are the FPGA I/O terminals that resource controller 50 accesses, for example, in response to force or read commands incoming packets convey.

An additional 144 I/O pins of each FPGA F1–F8 are linked to a corresponding one of connectors C1–C8 that may be used, for example, to connect FPGA I/O terminals to an external system when the emulator is used as an in-circuit emulator. Alternatively, when additional interconnections between FPGAs F1–F8 are needed, small circuit boards 75 or 76 mounted on connectors C1–C4 or C5–C8 can provide more signal paths between them. Trace patterns on circuit boards 75 and 76 can be custom designed when necessary to provide a desired interconnection pattern. When closed, a switch S9 interconnects the 144 I/O pins of FPGAs F1 and F5, to provide communication paths between circuit boards 75 and 76, when needed.

A set of eight RAMs M1–M8 are also included as part of emulation resources 48, and resource controller 50 can set any one of a set of bus switches S1–S8 to provide a 72-bit wide signal path providing each FPGA F1–F8 with read and write access to its corresponding RAM M1–M8.

Resource controller 50, suitably implemented by a boot PROM and a Xilinx Virtex-II FPGA, includes a JTAG bus through which an external host computer can supply programming data to the FPGA and the boot PROM. Local bus controller 74 is suitably implemented as a state machine for transferring data between FPGAs F1–F8 and the workstation or other resource boards via incoming and outgoing packets implementing force, read or other types of commands. Resource controller 50 also implements a "SelectMap" controller 78 in the form of another state machine for transferring programming data arriving in incoming packets to program inputs of FPGAs F1–F8 addressed by those packets.

A set of registers 79 implemented within controller 50 contain data for controlling states of switches S1–S9 and for controlling a multiplexer 80, also implemented within controller 50. Workstation 42 (FIG. 3) can send a packet addressed to controller 50 containing control data and commanding controller 50 to write the control data to registers 79. Resource controller 50 also includes a "data mover" circuit 88 for handling handshaking with link layer 68 for transferring data and commands between link layer 68 and various functional blocks of controller 64.

Multiplexer 80 selects from among 64 different clock signal sources to supply a set of up to 16 different clock signals to FPGAs F1–F8 and controller 50 via a global clock signal bus 82. A local clock signal generator (CSG) 84 provides 16 different clock signals (OSCCLK) of frequencies ranging, for example, from 78 KHz to 16 MHZ as inputs to multiplexer 80. An external circuit may supply up to 16 other clock signals (ICECLK) to multiplexer 80 via a connector 86, for example, to synchronize the operations of FPGAs F1–F8 to external circuits when the emulation system is used as an in-circuit emulator. Though not shown in FIG. 4, two I/O terminals of each of the eight FPGAs F1–F8 are also connected to inputs of multiplexer 80 so each FPGA F1–F8 can provide up to two gated clock signals (GATCLK) to itself and the other FPGAs. Resource controller 50 supplies another set of 16 clock signals (COSCLK) to multiplexer 80. Resource controller 50 generates edges of the COSCLK clock signals in response to commands incoming packets convey. COSCLK clock signals can be used, for example, to synchronize operations of FPGAs F1–F8 to operations of emulation resources mounted on other within those of workstation 42 (FIG. 3) when the emulation system operates in a co-validation mode of operation.

A random access memory (RAM) 81, suitably a high-speed SDRAM read and write accessed by a memory controller 83 within resource controller 50 provides read and write access to RAM. For example, since packets make most efficient use of network bus bandwidth resources when they convey data in large blocks, RAM 81 can be used to temporarily hold large blocks of data that controller 50 receives via packets until the data can be used, or for storing data acquired from the local emulation resources until it contains a sufficiently large block data to forward outward via a packet. During an emulation process, workstation 42 may want to control successive states of signals local bus controller 74 supplies to inputs of FPGAs F1–F8, but those signals may have to change state so frequently that it would be inefficient for the workstation to send a packet to controller 50 every time one or more of those input signals is to change state. The better approach is for workstation 42 to periodically send a packet containing a large block of data defining successive states of the FPGA input signals to be controlled. Memory controller 83 stores those blocks of data in RAM 81 and then periodically reads out successive portions of that data in response to requests from local bus controller 74 which has been programmed to generate those FPGA input signals.

RAM 81 can also store waveform data defining the time-varying behavior of test signals that the testbench indicates are to be supplied as DUT inputs. During the emulation process, memory controller 83 can read out the data and supply it to local bus controller 74 for controlling test signals it applies as inputs to FPGAs F1–F8.

RAM 81 can be used for storing data representing successive states of FPGA output signals to be analyzed following the emulation process to determine whether the emulated DUT behaved as expected. In such case local bus controller 74 is programmed to periodically sample the states of selected FPGA output signals and to pass data representing those states to memory controller 83 for storage in RAM 81. After having stored a sufficiently large block of such data in RAM 81, memory controller 83 can forward that block of data in a packet to workstation 42. RAM 81 may also be used to emulate DUT memory.

RAM 81 can also be used as an instruction memory for microcomputer 70.

Hierarchical Resource Allocation

A testbench typically describes an IC DUT hierarchically as a set of individual cells interconnected to form small, low-level circuit modules, with low-level modules being interconnected to form larger, higher level modules. The number of signal paths between cells and modules at any given level of the design hierarchy tends to decrease rapidly with increasing hierarchical level. Since cells forming modules at the lowest level of the design hierarchy tend to be highly interconnected, a great many signal paths normally reside within each low level module. While a large number of signal paths can interconnect low-level modules forming a next higher-level module, there are normally substantially fewer such module-to-module signal paths than are found inside each module. Relatively few signal paths normally interconnect modules at the highest level of the design hierarchy. For example when a DUT includes an embedded processor, a memory and one or more other modules at the highest level of its design hierarchy, each high level module may include millions of internal signal paths, but the high level modules communicate with each other through a parallel bus including only a few signal paths.

An emulation system in accordance with the invention mimics the hierarchical nature of a typical DUT design. For example, highly interconnected logic gates within individual FPGAs reside at the lowest level of the emulation hierarchy. Individual FPGAs and other resources mounted on resource boards form a next higher level of the emulating hierarchy, and each resource board on which they reside provides many signal paths between the FPGAs and other resources mounted on the board, though not as many as reside within each FPGA. The workstation and the resources boards themselves provide a next higher level of the emulation system hierarchy, and they communicate with one another though the virtual signal paths the packet routing network provides. Although a very large number of virtual signals paths are possible, the bandwidth of the network places a practical limit on the number of such virtual paths. Where necessary, bus arrangements within the packet routing network can be arranged to organize resource boards into higher-level groupings to provide increased bandwidth between resource boards.

When choosing resources for emulating the various parts of a DUT, the emulation system allocates its resources along hierarchical lines. Cells forming a module at the lowest level of DUT hierarchy are emulated where possible within the same FPGA. A set of low level modules forming a higher level module are also emulated when possible by the same FPGA, or when necessary, by FPGAs and other resources mounted on the same resource board. Separate resource boards emulate modules residing at higher levels of the DUT hierarchy. Such hierarchical allocation of resources matches the inter-module communication bandwidth requirements at each level of the hierarchical DUT design to the communication bandwidth capability of each level of the hierarchical emulation system.

System on Chip Emulation

Figure 5:
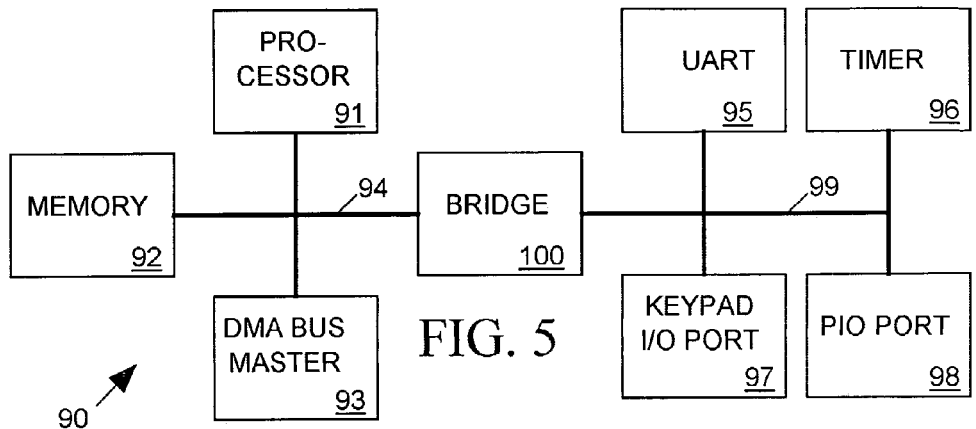
FIG. 5 illustrates a typical prior art "System-On-Chip" integrated circuit in block diagram form.

A hierarchical, network-based emulation system in accordance with the invention is particularly suitable for emulating "System-On-Chip" (SoC) integrated circuits that may include embedded processors, memories and other large, standardized intellectual property (IP) components. FIG. 5 depicts the major components of a typical SoC IC 90 including a standard processor 91, a standard memory 92, and various other components including a DMA bus master 93, a computer bus 94, a UART 95, a timer 96, a keypad I/O port 97 and a PIO port 98, a peripheral bus 99, and a bridge 100 linking buses 94 and 99.

When processing a testbench describing SoC 90, workstation 42 (FIG. 3) determines the nature of the various components of the SoC DUT and other portions of the testbench to be emulated and then allocates available emulation resources for emulating each component. Since the IP component designers will have already tested the functionality of IP components such as processor 91 and memory 92 that may be included in SoC 90, a system for emulating SoC 90 employing IP components need only emulate the behavior of those IP components at a relatively high level of abstraction, a task which for a suitably programmed workstation is well-suited. On the other hand, the emulation system will preferably employ programmable logic devices such as FPGAs to emulate various other components of the SoC at a lower level of abstraction to permit a designer to more thoroughly debug the design of such components. Thus for an SoC design, the system may take a "co-validation" approach to emulation using one or more computers to emulate large IP components of the SoC design and using FPGAs and other low level resources to emulate custom designed portions of the SoC design. The flexible network-based communication an emulation system in accordance with the invention provides between computers and resource boards renders it ideal for the co-validation approach.

Figure 6:
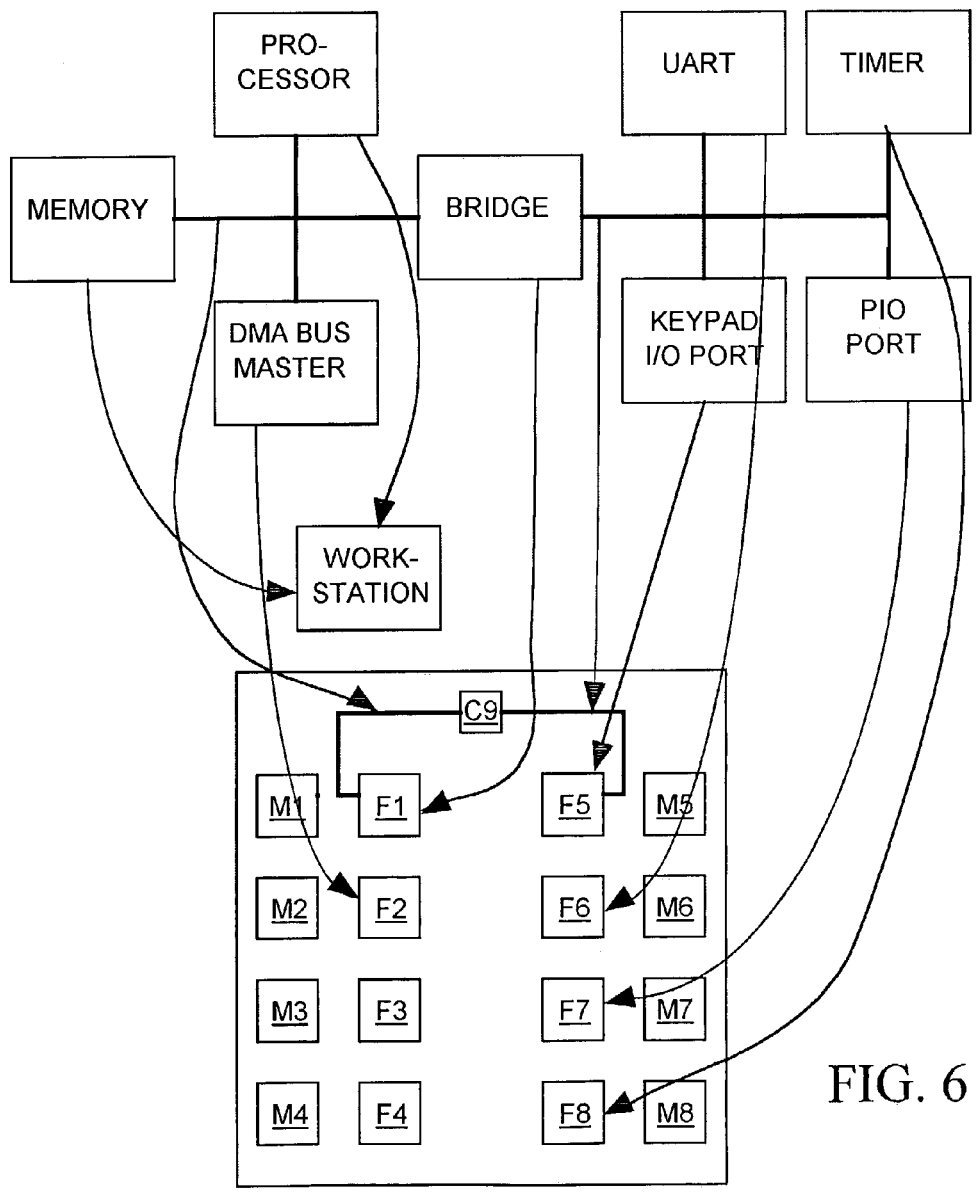
FIG. 6 illustrates a display produced by an emulation system in accordance with the invention indicting how emulation resources are allocated to modules of the IC of FIG. 5.

Upon allocating the emulation resources, workstation 42 displays a block diagram depicting the various components of the testbench to be emulated at a desired level of the design hierarchy the user specifies, and display depicts the available emulation resources at that hierarchical level. For example FIG. 6 shows a high level display the workstation would produce when allocating emulation resources to SoC 90 of FIG. 5. The display includes blocks representing major components of SoC 90 and blocks representing available emulation resources including in this example a workstation and a single FPGA resource board. The display graphically depicts how emulation resources are allocated by displaying an arrow extending from each block representing a DUT component to a block representing the resource to be used to emulate it. The designer can modify a resource allocation by using a mouse to drag the head of an arrow from one resource to another, however the resource allocation software will notify the user when the emulation resource the user selects to emulate an IC module is not of an appropriate type or capacity for emulating that resource.

In this example separate subsets of the 144 pins of FPGAs F1 and F5 interconnected via switch C9 emulate the buses 94 and 99 of SoC 90 and FPGA F1 emulates the bridge 100 interconnecting the two buses. FPGA F2 emulates DMA bus master 93, and FPGAs F5–F8 emulate devices 97, 95, 96 and 98, respectively. The workstation is assigned the task of emulating processor 91 and memory 92. If another resource board were available and needed to emulate SoC 90, that resource board would also appear in the display. When the system does not have sufficient hardware resources, the system can assign more emulation tasks to the workstation.

System Programming

Figure 7:
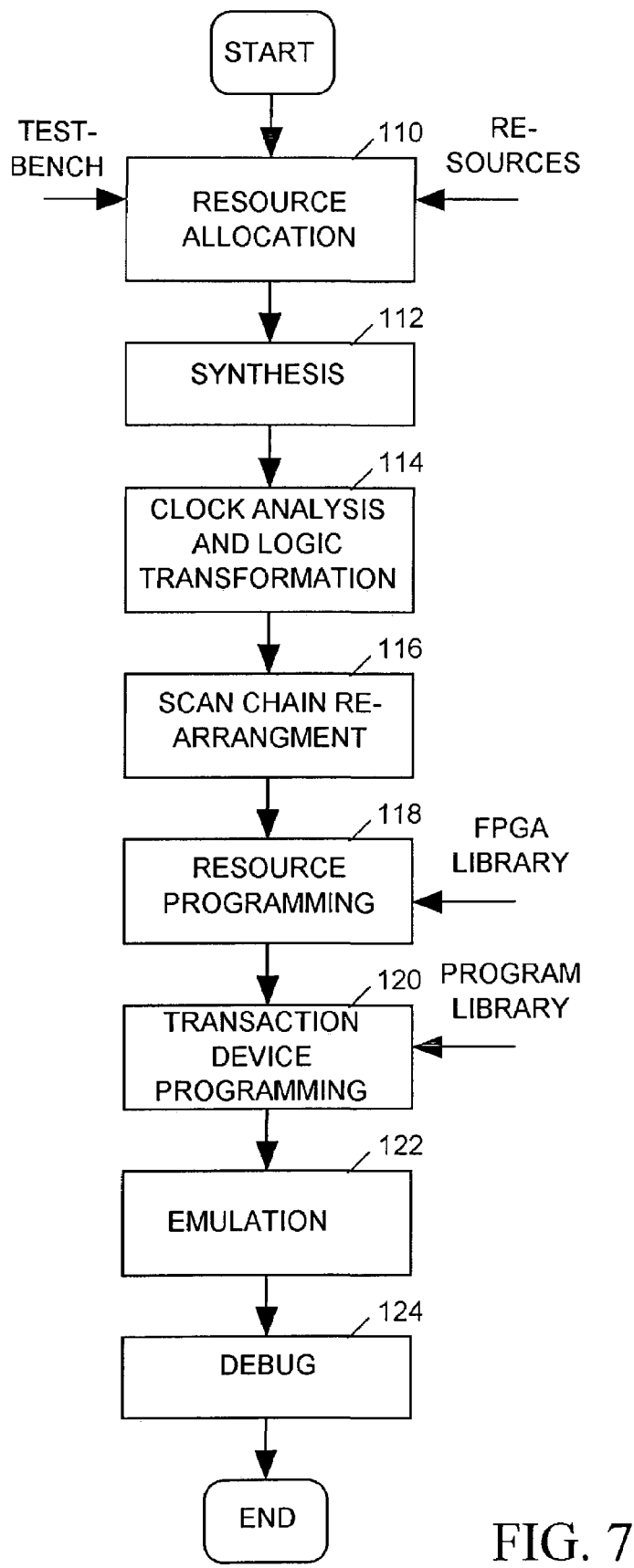
FIG. 7 is process flow diagram illustrating steps carried out by the workstation of the emulation system of FIG. 3.

FIG. 7 illustrates a process workstation 42 carries out to program the emulation system in response to a testbench a designer supplies in response to a description of the resources available in the emulation system. The workstation initially (step 110) processes the testbench to determine how to allocate resources for emulating the various modules of the DUT and for carrying out the test signal generation and DUT input and output signal monitoring functions the testbench describes.

Figure 19:
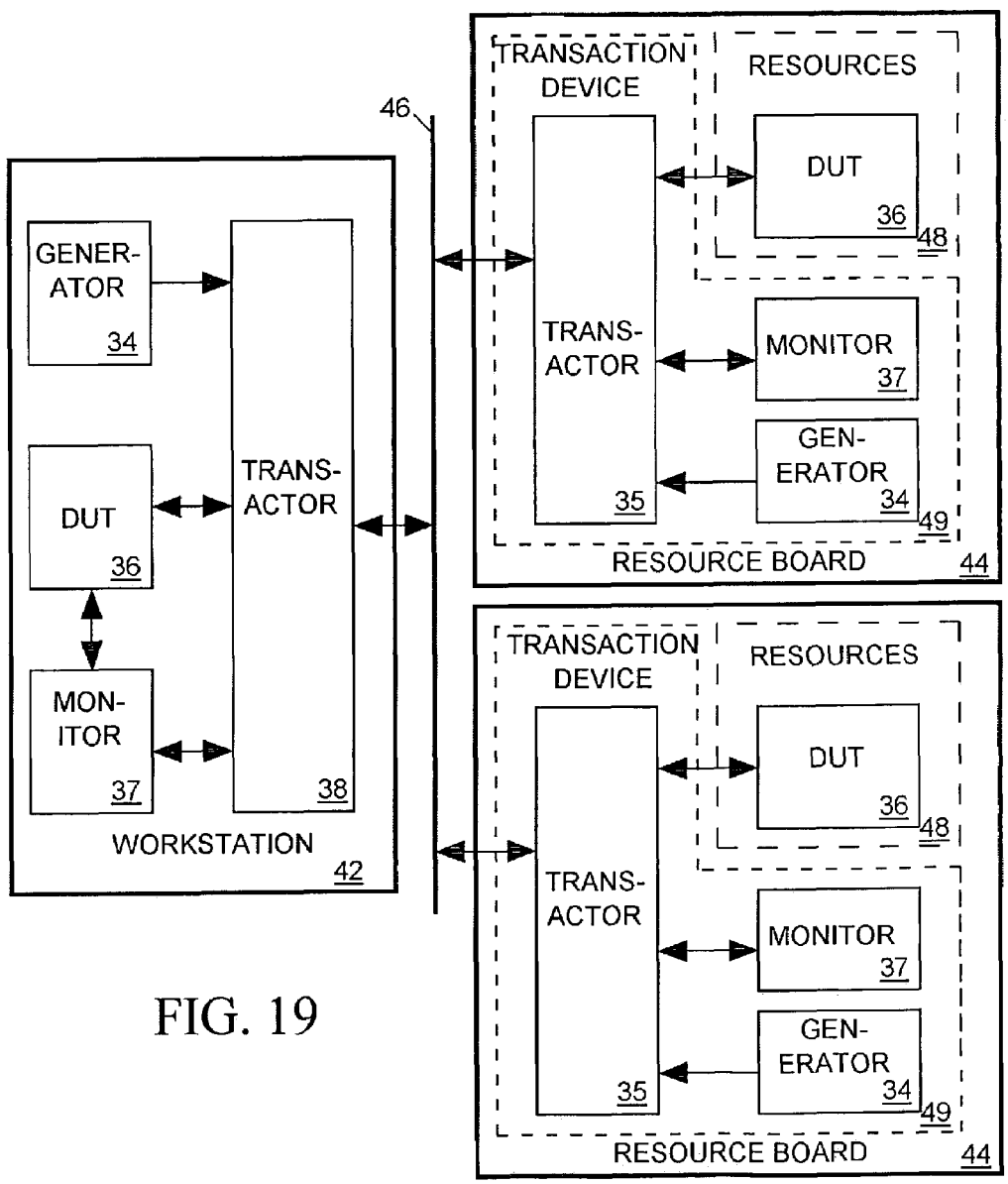
FIG. 19 illustrates in block diagram form how an emulation system in accordance with the invention may allocate its workstation and other resources when emulating a testbench.

FIG. 19 is a conceptual block diagram illustrating how workstation 42 can implement the various functions of a testbench including generators 34, DUT 36 and monitors 37. Generators 34 control the test signals supplied as input to DUT 36 while monitors 37 monitor DUT output signals and store data representing their states for later analysis by debugging software. Workstation 42 can choose to implement some portions of DUT 36 using resources on resource boards 44 and other portions of DUT by high-level software running on workstation 42. Generators 34 and monitors 37 can be implemented by transaction devices and by software on workstation 42.

All of the inputs and outputs of resources 48 and all of the internal data storage devices within resource 48 accessible to transaction devices 49 are mapped to separate addresses within a common memory space. When workstation software emulating a portion of DUT 36 or acting as a generator 34 wants to drive an input of any resource 48 to a particular state or to write data to any accessible storage location within resources 48, it executes a memory write instruction such as:

write location1 data1.

This instruction indicates that data (data1) is to be written to a memory address (locations) mapped to the resource input or storage location. Transactor hardware and software 38 running in the work station respond to the instruction by sending a packet addressed to the appropriate resource 48 containing a write command and data indicating the particular resource input and the state to which it is to be driven or referencing the particular resource storage location and indicating the data to be written to that storage location. The transactor 35 implemented by the transaction device 49 accessing that resource 48 then carries out the command included in the packet by driving the resource input to the indicated state or by writing the appropriate data to the indicated resource storage location.

When workstation software emulating a portion of DUT 36 or acting as a monitor 37 wants to learn the state of an output of a remote resource 48 or to read the contents of one of its storage locations, it executes a read instruction such as:
read location2.

This instruction indicates that data is to be read to memory address (location2) mapped to the resource output or storage location. Transactor hardware and software 38 respond to the instruction by sending a packet addressed to the appropriate resource 48 containing a read command and data referencing the particular resource output or storage location. The transactor 35 implemented by transaction device 49 accessing that resource 48 then carries out the read command included in the packet by determining the state of the resource output or by reading the contents of the resource storage location and return the data it obtains to workstation 42 via a packet. The transactor 38 within workstation 42 then returns the data included in the packet to the DUT emulation software 36 or monitor software in response to the read instruction.

Generators 34 or monitors 37 implemented by microprocessors 70 can interact with local or remote resources 48 or software running in workstation 42 emulating portions of DUT 36 in the same way, by read and write accessing appropriate memory addresses. Transactors 35 and 38 handle all of the low-level activities needed to carry out the interaction.

The memory read/write communication protocol simplifies the process of developing emulation software for workstation 42 and processors in transaction devices 49 because the emulation software need not handle low-level aspects of the communication between emulation resources, and because all software-driven resources communicate with hardware resources in the same way, simply by read and write accessing memory address. The communication protocol also renders the emulation system highly scalable since, given a large available memory space, a large number of resource inputs, outputs and storage locations can be mapped to the memory space.

Referring again to FIG. 7, the workstation therefore has much freedom to allocate resources for emulation various portions of the testbench among resources 48 on resource boards 44, microprocessors included in transaction devices 49 and workstation 42. Hardware resources 48 such as FPGAs can emulate portions of DUT that need to be emulated at a low level.

Software running on workstation 42 or on other computers connected via network 46 can emulate portions of DUT 36 such as embedded processors, memories and other large, well-tested IP cells for which only high level emulation is necessary. Generator software 34 or monitor software 37 also running on the workstation 42 or other computer can emulate portions of the testbench supplying test signals to or monitoring output signals of portions of the DUT 36 emulated by other software running on the workstation 42 or other computers. Generators 34 and monitors 37 implemented by the transaction devices 44 can emulate portions of the testbench that supply test signals or monitor output signals of portions of the DUT 36 emulated by the local resources 48. Any generator 34 or monitor 37 can also control test signals inputs or monitor output signals of remote resources.

After determining at step 110 how to allocate system resources for emulating the various parts of the testbench, the workstation carries out a synthesis process (step 112) where, when necessary, it converts portions of the testbench to various resources to a form appropriate to the nature of emulation resource to which each portion of the testbench is allocated. For example when the testbench uses a set of Boolean expressions to describe a particular DUT module to be emulated by an FPGA, the syntheses process at step 112 converts the expressions into a "gate level" description of a circuit implementing those Boolean expressions wherein the circuit is formed by a set of interconnected gates and other components of the type available in an FPGA.

As described in more detail below, the workstation 42 then analyzes the modified testbench to identify the clock signals that are to control the timing of logic operations within the DUT, and to modify the gate level description of any clock signal gating logic when necessary to eliminate clock signal skew problems (step 114). Also as detailed below, the workstation rearranges any scan chains that may be included in the DUT as necessary to minimize the number of virtual signal paths needed to convey scan data between portions of the DUT emulated by separate resource boards (step 116).

The workstation then programs all of the FPGAs and other resources to be employed in the emulation (step 118) by sending packets containing programming data to the transaction devices of the resource boards containing the resources to be programmed. For FPGAs, the workstation consults an FPGA program library the FPGA manufacturer provides to produce FPGA programs for emulating the various logic gate arrangements the testbench describes. When the workstation is to emulate a portion of the DUT, the workstation also develops a program at step 118 enabling it to emulate that DUT component, basing the program on the testbench description of the portion of the module. The workstation may obtain a program enabling it to emulate the high level behavior of various IP components from libraries IP component developers provide.

At step 120, the workstation develops control and programming data for the transaction device 49 (FIG. 3) of each resource board and transmits that data via packets to each transaction device 49. Each transaction device may write some of the control data into control registers, such as registers 79 (FIG. 4) for controlling connections between resources on the resource board. Programming data arriving via packets may also be used to program state machines within the transaction devices to carry out appropriate interfacing activities with respect to transmitting and processing various types of data via packets and communicating with the local resources or to program processor in the transaction devices that are to implement generators or monitors.

Workstation 42 then starts the emulation process (step 122), for example, by sending packets signaling transaction devices to reset the emulated DUT to an initial state, to begin supplying test signal inputs to emulation resources and to begin processing resource output signals. When emulation process ends, the workstation facilitates a debugging process (step 124) by executing "variable resolution" debugging software as described below enabling a user to analyze probe data collected during the emulation process.

Clock Analysis

Like the DUT it emulates, the emulation system employs various clock signals to coordinate the timing of various logic components. When a clock signal clocks two or more components, each edge of that clock signal should arrive at each component with little time difference ("skew"). The clock analysis and logic transformation step 114 of FIG. 5 identifies and eliminates clock skew problems.

Figure 8:
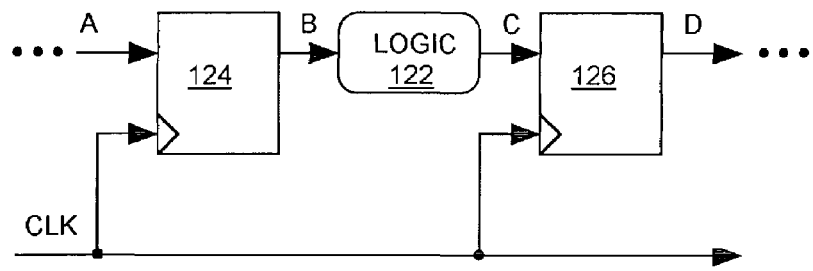
FIGS. 8–10 illustrate in block diagram form clocked logic circuits that a field programmable gate array (FPGA) can emulate.

For example as illustrated in FIG. 8, an FPGA can implement synchronous register transfer logic in which inputs and outputs of a block of logic 122 are linked through latches 124 and 126 clocked by a system clock signal CLK. In an FPGA the system clock signal is delivered to latches 124 and 126 though one of a set of dedicated clock buses, and each clock bus is designed to convey the system clock signal from one the FPGA's I/O terminals to all latches the FPGA that are to be clocked by it with very little clock signal skew.

Figure 9:
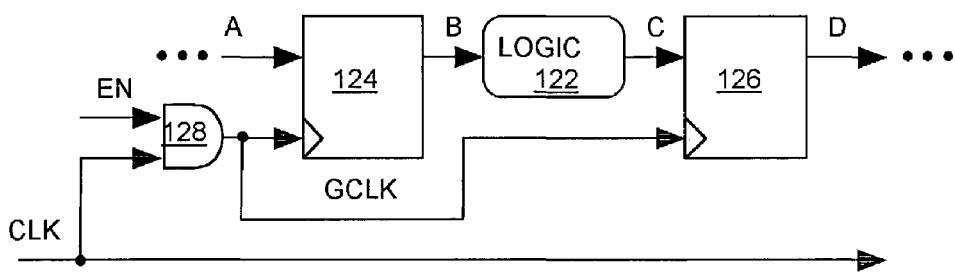
Figure 10:
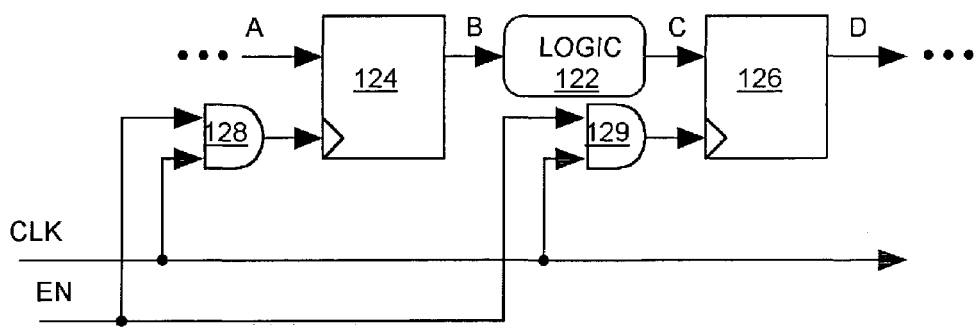

However an FPGA is not well-adapted for handling a gated clock signal system as illustrated in FIG. 9 where latches 124 and 126 are clocked by a clock signal GCLK gated by an AND gate 128 in response to an enable signal EN and a system clock signal CLK. Since gate 128 may be closer to latch 124 than latch 126, GCLK signal skew will be problematic if the output C of logic block 122 changes state in response to a GCLK signal edge arriving at latch 124 before the GCLK signal edge arrives at latch 126. When a placement and routing tool generates a layout for an IC containing a gated clock signal, timing analysis software analyzes the layout to identify clock signal skew and inserts buffers in the clock signal path as necessary to adjust delays through selected branches of the clock signal path to eliminate these kind of skew problems. But when an FPGA emulates the circuit of FIG. 9, inserting buffers in appropriate branches of the GCLK signal path clock cannot readily eliminate clock skew. But revising the logic so that no gated clock signal clocks more than one latch can eliminate clock skew. For example the logic of FIG. 9 can be revised as shown in FIG. 10 to provide two AND gates 128 and 129 instead of one, each separately gating CLK signal to produce a gated clock signal for a corresponding one of latches 124 and 126. The CLK signal is routed to both AND gates 128 and 129 via one of the FPGA's clock buses so it exhibits very little skew, and the symmetric path delays similar devices emulating gates 128 and 129 provide ensure that latches 124 and 126 are clocked with little skew.

Scan Chain Re-Arrangement

Figure 11:
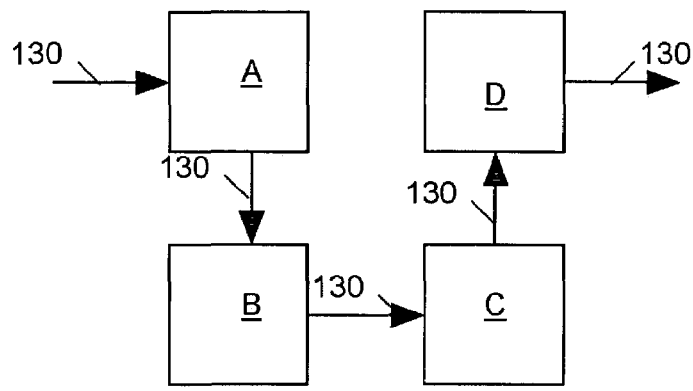
FIGS. 11–13 illustrate in block diagram form a set of FPGAs interconnected by scan buses to form scan chains.

As illustrated in FIG. 11, a DUT may include a scan bus 130 linking a set of shift registers ("scan registers") implemented within of modules A–D in series. Scan bus 130 may include, for example, a data line connected from register-to-register for conveying, a clock line for clocking the data through the registers, and one or more control lines for telling the circuits containing the scan registers when to read data in or write data to the scan registers. A scan bus allows an external circuit to shift large amounts of data in and out of various modules of the DUT without having to use very many of the DUT's I/O terminals.

Figure 12:
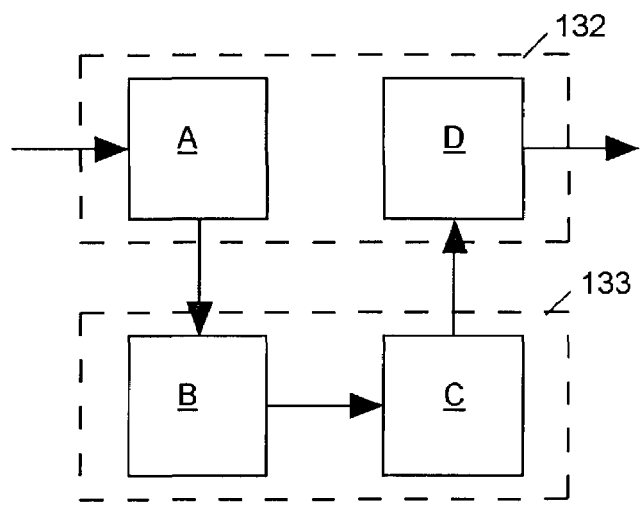
Figure 13:
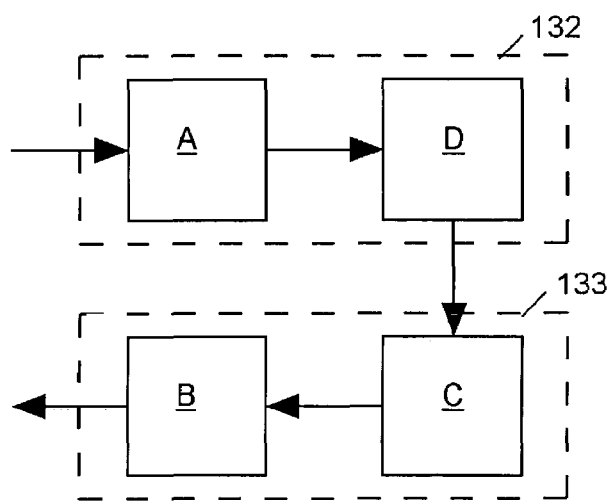

When an emulated DUT contains a scan bus, not all of the emulation resources emulating the various modules of the DUT may reside on the same resource board. For example, as illustrated in FIG. 12 FPGAs on one resource board 132 may emulate modules A and D while FPGAs on another resource board 133 may emulate modules B and C. With this allocation, the scan bus requires two virtual paths between the two resource boards 132 and 133, one providing the A-to-B path and the other providing the C-to-D path. Packet traffic between the two resource boards would emulate these paths. Rerouting the scan bus to follow the route A–D–C–B as illustrated in FIG. 13, rather than the route A–B–C–D as illustrated in FIG. 12 can reduce the number of virtual signal paths between the two resource boards to one. Thus to reduce the number of scan bus paths between modules, workstation 42, at step 116 of FIG. 7, studies the emulation resource allocation plan it developed at step 110 and rearranges the module-to-module scan bus routing when doing so can reduce the number of scan data paths between separate emulation resources. The workstation also appropriately re-arranges the test vectors the testbench describes that shift data in and out of the scan chain to accommodate the scan chain re-arrangement.

Network Architecture

Figure 14:
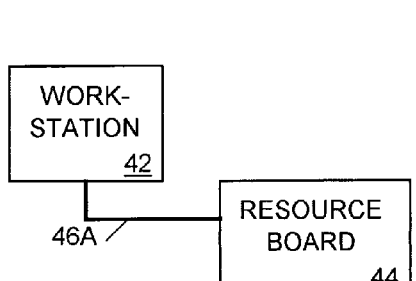
FIGS. 14–17 illustrate in block diagram form variety network configurations for providing communication paths between a workstation and a set of resource boards of an emulation system.
Figure 15:
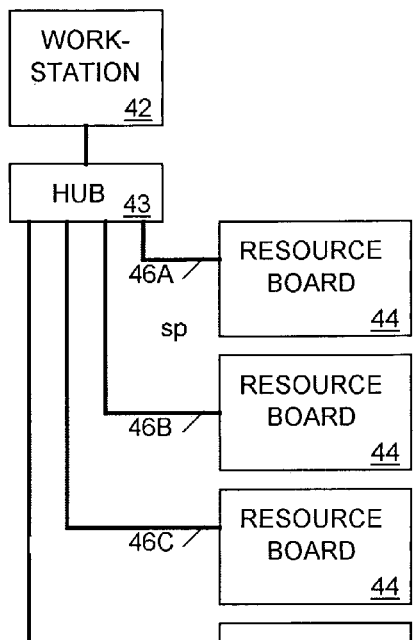
Figure 16:
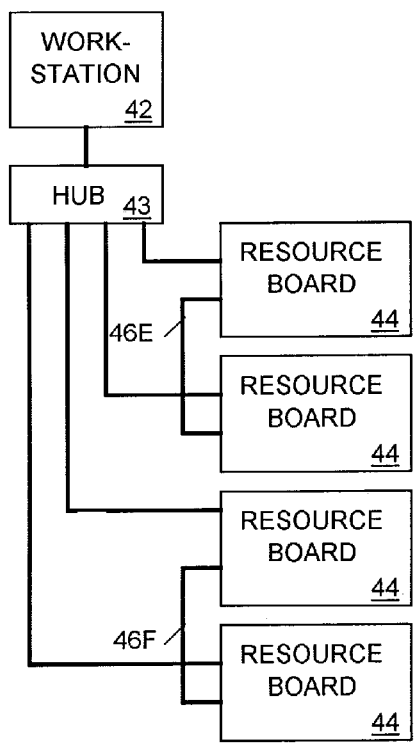
Figure 17:
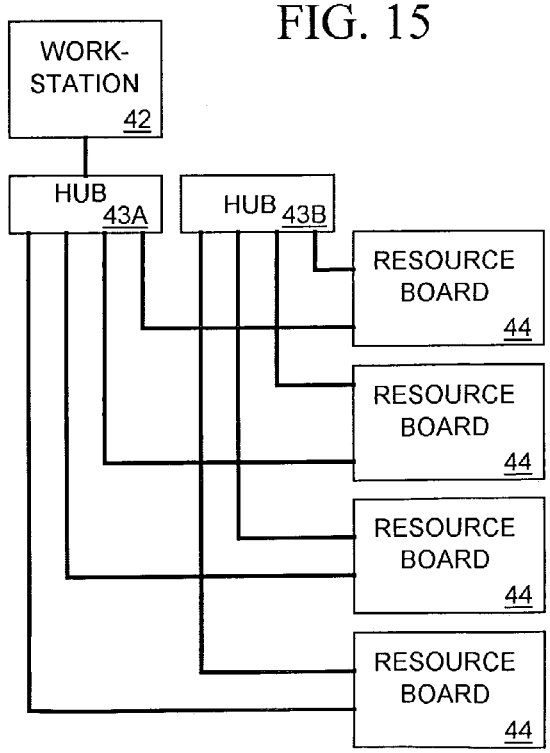
Figure 18:
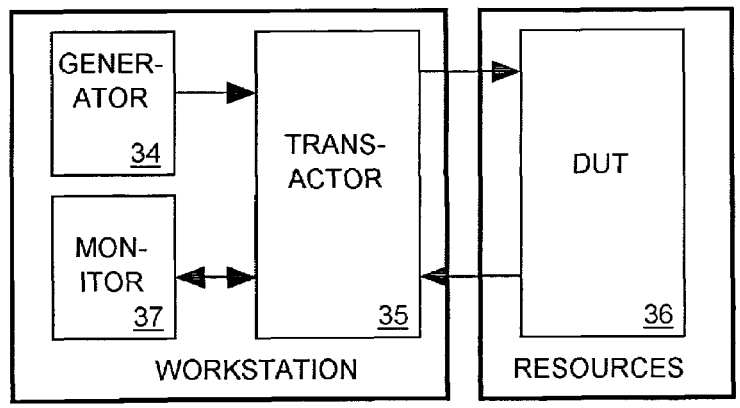
FIG. 18 illustrates in block diagram form how a prior art emulation system employs a workstation and emulation resources when emulating a testbench.

The emulation system's packet routing network 46 of FIG. 3 can be configured in a variety of ways depending on the bandwidth requirements for the virtual signal paths they provide between various system components. For example as illustrated in FIG. 14 when the emulation system includes workstation 42 and only a single resource board 44, they can be directly interconnected by a single bus 46A. As illustrated in FIG. 15, when the emulation system includes more than one resource board 44, they can communicate with one another and with workstation 42 through a network hub 43 and buses 46A–46D linking the resource boards to hub 43. Hub 43 may be an intelligent routing hub that passes packets only to the resource board that containing the resource addressed by the destination address in the packet, thereby eliminating unnecessary packet traffic to other parts of the system. Since each resource board 44 includes two bus ports, additional buses 44E and 44F can directly interconnect the second ports of pairs of resource boards as illustrated in FIG. 16 to permit high bandwidth packet traffic between them. FIG. 17 illustrates a bus arrangement employing two routing hubs 43A and 43B interconnecting the ports of resource boards 44.

Full Vision Debugging Mode

The purpose of the emulation process is to collect "probe data" representing the time varying behavior of various signals that the DUT produces in response to test signals applied to its input. At step 124 of FIG. 7, debugging software running on the workstation helps a designer analyze the probe data collected during the emulation process to determine whether the emulated DUT behaved as expected and if not, to determine what may be wrong with the DUT design. In the emulation system in accordance with the invention, monitors 37 (FIG. 19) transaction devices 49 implement can acquire probe data via read requests to transactors 35 and can store the probe data representing states of those signals in local RAMs 81 (FIG. 4). After the emulation, debugging software running on the workstation can request transaction devices 49 to forward the probe data contents of RAMs 81 to the workstation via packets so that it can be analyzed. Storing the probe data in RAMs 81 during the emulation helps to reduce packet traffic on network 46 and can enable the emulation to proceed at higher frequencies.

An emulator in accordance with the invention may operate in a "full vision" mode wherein each transaction device 49 (FIG. 3) acquires probe data for all monitored DUT signals during each system clock cycle in which a DUT signal may change state. The full vision mode enables workstation 42 to debug emulator operation on a cycle-by-cycle basis. But monitors 37 in the resource boards can acquire a very large amount of probe data during a full-vision mode emulation, and when the amount of probe data collected is too large to store in the local RAMs 81 until the end of the emulation process, the transaction devices must forward blocks of probe data from local RAMs 81 to the workstation via packets during emulation process so that the workstation can store it, for example, on a hard disk. Due to bandwidth limitations on the network it may be necessary to greatly reduce the frequency of the system clock controlling the rate of state changes in the DUT output signals to limit the rate at which the resource board must acquire and forward probe data via packets to the workstation. Alternatively it may be necessary to halt the emulation process while probe data is being forwarded to the workstation. Thus the full vision mode of operation can greatly slow the emulation process, particularly when many DUT signals are being monitored. This can be problematic, particularly for in-circuit emulations where real-time emulation is preferable.

Cycle-Driven Variable Resolution Debugging Mode

The emulation system in accordance with the invention resolves the probe data overload problem associated with full vision mode operation by alternatively operating in a "variable-resolution debugging mode". In the variable resolution debugging mode, the workstation commands the transaction device 49 of each resource board (FIG. 3) to set multiplexer 80 to select a clock signal for controlling when monitors 37 (FIG. 19) collect probe data that is lower in frequency than the system clock signal that clock state changes in the emulated DUT output signals. Monitors 37 thus acquire probe data representing the state of each monitored DUT signal only once every N cycles of the system clock signal, where N may initially be a large number (e.g. 1,000,000). Thus when operating in the variable resolution mode, monitors 37 acquire only 1/Nth as much probe data as they would acquire when operating in the normal resolution mode. However the probe data monitors 37 acquire in the variable resolution mode forms only a "low resolution" picture of each monitored DUT signal in that it depicts its state on only every $N^{th}$ system clock cycle.

After using debugging software to review the low resolution probe data, a user might like to have a higher resolution picture view of the DUT signals (e.g. N=1000 instead of 1,000,000) during some portion of the emulation process sufficiently short that the probe data collected will not overload memory resources. The user then commands the emulation system to repeat that particular period of the emulation process with the N set to 1000 instead of 1,000,000. At the end of the process the user can use debugging software to analyze the higher resolution probe data for that period of the emulation. Should the user thereafter wish to look at probe data with "full-vision" resolution (e.g. N=1) for a very short portion of the emulation process, the user can command the emulation system to repeat that very short portion of the emulation process with the N set to 1.

In order to repeat the emulation process during some short period of interest, the emulator must be able to set the emulation resources to the states they had at the start of that period of interest. One way to do that is to restart the emulation process from the beginning with the probe data collection initially being suppressed so that no probe data is collected until the emulation process reaches the period of interest. The emulator then begins collecting probe data at the start of the period of interest with N set to the appropriate value, and then stops the emulation process at the end of the period of interest. However this approach can be time-consuming when the period of interest occurs late in the emulation process.

Another way to reset the emulator to a state it had at the start of some period of interest during a previous emulation process is to drive it directly to that state. Many FPGAs can respond to a "read" command by generating a data sequence on an output "probe bus" indicating the states of the output signal of every clocked device, and can respond to a "write" command by setting the output signals of all of its internal clocked devices to states indicated by a data sequence supplied via the probe bus.

Referring to FIGS. 3 and 4, when operating in the variable debugging mode, local bus controller 74 can respond to a block read command in an incoming packet from workstation 42 by signaling any one of FPGAs F1–F8 the packet addresses to return a block of data via a probe bus 71 to memory controller 83 indicating the states of signals appearing at each of its internal clocked devices (latches or flip-flops). That block of data therefore acts as a "snapshot" of the state of the FPGA. When the workstation initiates a block write operation at several points during the emulation process for each FPGA F1–F8 involved in the emulation process, then at the end of the emulation process, RAM 81 will store several sets of snapshot data, each representing the state FPGAs at separate times during the emulation process.

Thereafter, during the debugging process, when a user determines that it would be helpful to redo the emulation process starting at a point during the emulation at which a particular snapshot was stored in RAM was acquired, the workstation 42 sends packets containing block write commands to memory controller 83 telling it to read the snapshot data corresponding to the starting point of interest from RAM 81 and to write that snapshot data back into FPGAs to return them to the states they had when the snapshot data was initially required. The workstation also sends control data to local bus controller 74 setting it to acquire probe data more frequently. The emulation process then begins again at that point of interest.

To make use of this "state restoration" approach, the system must set all emulation resources, not just FPGAs, to their appropriate states at the start of the emulation period of interest. Thus it may be necessary for the emulation system to also save state data indicating the states of other resources employed during the emulation process whenever it saves FPGA state data. For example, when a memory emulates a portion of a DUT, the emulator can save the current contents of the memory on the workstation hard disk so that it can write it back into the memory before repeating the emulation period of interest. When software running on the workstation emulates a portion of the DUT, the software should save any data it needs to restore its current state of its program execution. The state restoration approach is therefore suitable, when FPGAs and other devices for which current operating states can be saved and restored emulate all portions of a DUT, but is not suitable when devices for which state data cannot be quickly and conveniently saved or which cannot be restored to states defined by such data emulate portions of the DUT.

Event-Driven Variable Resolution Debugging Mode

In an "event-driven" variable resolution debugging mode, a local monitor 37 (FIG. 19) running on local microcomputer 70 (FIG. 4) monitors resource outputs and generates an interrupt when it detects a triggering event. A triggering event leading to an interrupt could be, for example, an assertion or a pattern of assertions of a particular DUT output signal or the appearance of a particular pattern in a set of DUT output signals. Monitor 37 may maintain a count of the number of test cycles that have occurred and may respond to triggering events only during certain test cycles.

An interrupt causes microprocessor 70 (or event handler hardware local controller 50 may implement) to execute an interrupt routine telling it to signal local controller 50 to temporarily halt the system clock(s) controlling DUT logic operations and to initiate a snapshot operation wherein it saves data representing the current state of emulation resources 48 in RAM 81 (FIG. 7) and to also save data indicating the current test cycle count. The microprocessor 70 can also forward packets propagating the interrupt to transaction devices 49 of other resource boards 44 and to workstation 44 commanding them to also store snapshot data. After the snapshot data is saved, the system clock is restarted to resume the emulation process. The interrupt debugging mode thus allows snapshots to be collected in response to triggering events occurring during the emulation rather than periodically as in the cycle-driven variable resolution mode.

Other Uses of Interrupts

Interrupts can be used, for example, to temporarily halt the emulation process while some incidental activity is being carried out. An interrupt may be used to halt the emulation process while probe or snapshot data is being forwarded from RAM 81 to the workstation. Or, for example, testbench may include a statement such as the following:

If sync true('enable'=1) @clk then print b;

This statement says that if a signal called "enable" is true when a clock signal called "clk" is asserted, then the current value of a signal called "b" is to be printed on a printer. This kind of statement is intended to be executed by a computer, such as the workstation, having access to a printer. But when signals "enable", "b" and "clk" are produced and monitored on the local resource boards, having the workstation execute this statement can slow the emulation process. To resolve this problem, a monitor 37 implemented by the microprocessor 70 on which the signals are generated can be programmed to generate an interrupt when the signal conductions arise by generating an interrupt during which it writes the value of signal "b" to RAM 81 instead of printing it on a printer.

Each FPGAs F1–F8 may also produce up to two interrupt outputs 101 that local bus controller 74 forwards to microprocessor 70 to initiate interrupt routines to carry out only desired functions.

Thus has been shown and described an apparatus for emulating the behavior of an electronic circuit (DUT) including one or more computers and one or more resource boards containing emulation resources suitable for emulating portions of the DUT. Each resource board includes transaction device for communicating with one another and with the computer network via data packets transmitted over a packet routing network. The packet routing network and the transaction device on each resource board provide virtual signal paths between input and output terminals of resources mounted on separate resource boards conveying packets between the resource boards containing data representing signal states. When the workstation is to emulate a portion of the DUT, the packet routing network also provides virtual signal paths between the computer(s) and the resource boards. A workstation computer may also transmit programming data to the emulation resources via the packet routing network.

The foregoing specification and the drawings depict an exemplary embodiment of the best mode of practicing the invention, and elements or steps of the depicted best mode exemplify the elements or steps of the invention as recited in the appended claims. However the appended claims are not necessarily limited to the exemplary embodiment of the invention described above. The claims are intended to apply to any mode of practicing the invention comprising the combination of elements or steps as described in any one of the claims, including elements or steps that are functional equivalents of the example elements or steps of the exemplary embodiment of the invention depicted in the specification and drawings.

The invention claimed is:

1. A method for processing a hardware description language (HDL) testbench describing an electronic device under best (DUT), describing a time-varying behavior of a plurality of test signals, and identifying a plurality of probe points within the DUT, to determine how response signals appearing at the identified probe points would behave if the test signals were to be applied as inputs to the DUT, the method comprising the steps of:

a. providing a plurality of first emulation resources for emulating portions of the DUT, wherein each first emulation resource produces output signals in response to input signals with logical relationships between each first emulation resource's input and output signals being controlled by programming data supplied as input to that first emulation resource;

b. providing first signal paths between the first emulation resources so that they can transmit output signals to and receive input signals from one another;

c. providing a packet routing network for conveying packets;

d. connecting a first transaction device to the packet routing network and to each of the first emulation resources, wherein each first emulation resource has associated therewith a unique network address; and e. transmitting a packet to the first transaction device via the packet routing network, wherein the packet includes a network address identifying one of the first emulation resources, a command, and data, and wherein the first transaction device responds to the command by communicating with the identified first emulation resource via at least one of its input and output signals.

2. The method in accordance with claim 1 wherein the first transaction device responds to the command by determining a state of at least one of the output signals of the identified first emulation resource and generating state data indicating the determined state, and transmitting another packet containing the generated state data via the packet routing network.

3. The method in accordance with claim 1 wherein the first transaction device responds to the command by driving at least one of the identified first emulation resources to a state indicated by the data included in the command.

4. The method in accordance with claim 1 further comprising the step of:
   f. connecting a computer to the packet routing network, wherein the computer transmits packets to and receives signal data packets from the first transaction device via the packet routing network.

5. The method in accordance with claim 4 further comprising the steps of:
   g. processing the testbench to generate emulation resource programming data for each first emulation resource and to generate a computer program for the computer;
   h. supplying the programming data to each first emulation resource; and
   i. causing the computer to execute the computer program causing the computer to emulate a portion of the testbench.

6. The method in accordance with claim 5 wherein step h comprises transmitting programming packets via the packet routing network to the first transaction device, wherein each programming packet conveys programming data and a network address uniquely identifying one of the first emulation resources, and wherein the first transaction device responds to each such programming packet by providing the programming data it conveys as programming data input to the first emulation resource identified by the network address it conveys.

7. The method in accordance with claim 5 wherein in the course of executing the computer program, the computer transmits packets to and receives signal data packets from the first transaction device via the packet routing network.

8. The method in accordance with claim 5,
   wherein in the course of executing the computer program, the computer transmits a packet to the first transaction device via the packet routing network including a network address uniquely identifying one of the first emulation resources and a read command, and
   wherein the first transaction device responds to the read command by generating and transmitting another data packet to the computer via the packet routing network including data indicating a state of at least one output signal of the identified first emulation resource.

9. The method in accordance with claim 1 further comprising the step of:
   f. providing second signal paths between at least one of the first emulation resources and equipment designed to communicate with the DUT being emulated so that the at least one first emulation resource can communicate with that equipment via signals conveyed by the second signal paths.

10. The method in accordance with claim 1 further comprising the steps of:
    f. providing a plurality of second emulation resources, wherein each second emulation resource produces output signals in response to input signals, wherein logical relationships between each second emulation resource's input and output signals are controlled by programming data supplied as input to that second emulation resource;
    g. providing second signal paths between ones of the second emulation resources so that they can transmit output signals to and receive input signals from one another via the second signal paths; and
    h. connecting a second transaction device to the packet routing network and to each of the second emulation resources, wherein the second transaction device receives packets via the packet routing network, and sets states of some of the second emulation resource's input signals in accordance with data conveyed by the packets.

11. The method in accordance with claim 10 wherein each packet conveying data for controlling a state of any signal of any particular emulation resource of the first and second emulation resources also conveys a network address uniquely identifying that particular emulation resource.

12. The method in accordance with claim 11
    wherein the first transaction device also monitors some of the output signals of the first emulation resources and transmits packets via the packet routing network containing data indicating states of the output signals it monitors, and
    wherein the second transaction device also monitors some of the output signals of the second emulation resources and transmits packets via the packet routing network containing data indicating states of those output signals it monitors.

13. The method in accordance with claim 12 further comprising the stop of:
    f. connecting a computer to the packet routing network, wherein the computer transmits packets to and receives packets from the first and second transaction devices via the packet routing network.

14. The method in accordance with claim 13 further comprising the steps of:
    g. processing the testbench to generate emulation resource programming data for each first and second emulation resource and to generate a computer program for the computer;
    h. supplying the programming data to each first and second emulation resource; and
    i. causing the computer to execute the computer program.

15. The method in accordance with claim 14 wherein step h comprises transmitting packets via the packet routing network to the first and second transaction devices, wherein each packet conveys programming data and a network address uniquely identifying one of the first and second emulation resources, and wherein one of the first and second transaction devices respond to the packets by providing the programming data they conveys as programming data input to the first and second emulation resource identified by the network addresses those packets convey.

16. The method in accordance with claim 14 wherein in the course of executing the computer program, the computer transmits packets to and receives packets from the first and second transaction devices via the packet routing network.

17. The method in accordance with claim 12 further comprising the steps of:
   f. processing the testbench to generate programming data; and
   g. supplying the programming data to each first and second transaction devices wherein the programming data causes the first and second transaction devices to execute commands conveyed by packets received by the packet routing network.

18. The method in accordance with claim 17 wherein step g comprises transmitting packets via the packet routing network conveying the programming data to the first and second transaction.

19. The method in accordance with claim 10 further comprising the step of:
   i. providing third signal paths between ones of the first emulation resources and ones of the second emulation resources so that they can communicate with one another via signals conveyed by the third signal paths.

20. The method in accordance with claim 10 wherein the first transaction device sends at least one signal data packet to the second transaction device causing the second transaction device to set a state of at least one input signal to at least one of the second emulation resources.

21. The method in accordance with claim 1 wherein the first transaction device supplies a clock signal as input to at least one of the first emulation resources for clocking logic implemented within that first emulation resource.

22. The method in accordance with claim 21 wherein the first transaction device generates pulses of the clock signal in response to commands conveyed in packets transmitted to the first bus via the packet routing network.

23. The method in accordance with claim 21 wherein the first transaction device generates the clock signal in response to a signal received from an external source.

24. The method in accordance with claim 21 wherein the first transaction device includes an oscillator for generating the clock signal.

25. The method in accordance with claim 21
   wherein the first transaction device generates pulses of a first clock signal in response to commands conveyed in packets transmitted to the first bus via the packet routing network,
   wherein the first transaction device receives a second clock signal in response from an external source,
   wherein the first transaction device includes an oscillator for generating a third clock signal, and
   wherein the first transaction device includes means for selecting any one of the first, second and third clock signals as the clock signal input to the at least one of the first emulation resources.

26. The method in accordance with claim 1
   wherein the first transaction device includes a random access memory (RAM), and
   wherein the first transaction device responds to a command conveyed in a packet via the packet routing network by storing the RAM data also conveyed in the command, and thereafter controls states of at least one input signal to at least one of the first emulation resource's in accordance with the data it stored in the RAM.

27. The method in accordance with claim 1
   wherein the first transaction device also monitors some of the output signals of the first emulation resources,
   wherein the first transaction device includes a random access memory (RAM),
   wherein the first transaction device stores probe data into the RAM indicating states of the first emulation resource output signals it monitors, and
   wherein the first transaction device reads probe data from the RAM and transmits packets on the packet routing network conveying the probe data it read out of the RAM.

28. The method in accordance with claim 1 wherein the DUT being emulated includes a computer processor and a memory connected to the computer processor by a bus, wherein the computer processor writes data to the memory and reads data from the memory via the bus, and wherein the method further comprises the steps of:
   f. providing a random access memory (RAM) for emulating the memory;
   g. providing a computer connected to the packet routing network and a second transaction device to the packet routing network for emulating the computer processor,
      wherein the computer transmits packets containing write commands and read commands to the second transaction device via the packet routing network,
      wherein the first transaction device responds to a write command conveyed in a packet by writing data conveyed in the packet into the RAM, and
      wherein the first transaction device responds to a read command conveyed in a packet by reading data from the PAN and sending a packet conveying the data read from the RAM to the computer via the packet routing network.

29. An apparatus for emulating behavior of an electronic device under test (DUT) having a plurality of components, the apparatus comprising:
   a packet routing network for conveying data packets via electronic signals;
   a plurality of first emulation resources, each first emulation resource having a plurality of terminals, and each for emulating a separate component of the electronic equipment by generating output signals at its terminals in response to input signals applied to its terminals, each first emulation resource having a unique network address; and
   a first transaction device connected to the packet routing network for transmitting and receiving packets via the packet routing network, and connected to a first portion of the input terminals of each first emulation resource for transmitting input signals to that first emulation resource, for responding to at least one packet transmitted via the bus system identifying one first emulation resource by its network address by communicating with at least one of the identified resource's terminals via signals.

30. The apparatus in accordance with claim 29 wherein said at least one packet identifies at least one terminal of the identified first emulation resource, identifies a signal state, and commands the first transaction device to supply an input signal of the identified state to the identified terminal.

31. The apparatus in accordance with claim 29 further comprising at least one first conductive path for conveying a signal from at least one terminal of at least first emulation resource to at least one terminal of at least one other of first emulation resource.

32. The apparatus in accordance with claim 29
   wherein at least one of the first emulation resources is a programmable logic device [PLD] including a programming data input, wherein logical relationships between the PLD's input and output signals are determined by components within the PLD configured to implement the logical relationships by programming data supplied to the PLD's programming data input, wherein the transaction device is also connected for supplying programing data to the PLD's programming data input, and wherein one of the packets conveyed via the packet routing network identifies the PLD by its network address, includes programming data, and commands the transaction device to supply the included programming data to the PLD's program data input.

33. The apparatus in accordance with claim 32 wherein the PLD is a field programmable gate array.

34. The apparatus in accordance with claim 29
wherein the first transaction device monitors output signals appearing at terminals of at least one of the first emulation resources, and
wherein the at least one packet transmitted via the bus system identifies one of the first emulation resources by its network address, and commands the first transaction device to transmit a packet via the network bus containing data indicating states of the monitored output signals.

35. The apparatus in accordance with claim 29 further comprising a computer for communicating with the first transaction device via packets conveyed by the packet routing network.

36. The apparatus in accordance with claim 29 further comprising conductive paths for interconnecting some of the terminals of ones of the first emulation resources to terminals of others of the first emulation resources, wherein the first emulation resources are field programmable gate array (FPGAs), each FPGA including a programming data input, with logical relationships between each FPGA's input and output signals being determined by electronic circuits within that FPGA that are configured by programming data supplied to the FPGA's programming data input by the transaction device, the transaction device obtaining the programming data from a packet conveyed by the packet routing network.

37. The apparatus in accordance with claim 29 further comprising
a plurality of second emulation resources, each second emulation resource having a plurality of terminals, each for emulating a separate component of the DUT by generating output signals at its terminals in response to input signals applied to its terminals, each also having a unique network address; and
a second transaction device connected for receiving packets conveyed via the packet routing network and connected to a first portion of the terminals of each of the second emulation resources for transmitting input signals to the second emulation resources, the first transaction device transmitting a packet via the bus system identifying one of the second emulation resources by its network address, indicating a state to which at least one input signal of the identified second emulation resources is to be driven, and causing the second transaction device to drive the identified at least one input signal of the identified second emulation resource to the indicated state.

38. The apparatus in accordance with claim 37 further comprising second conductive paths for interconnecting terminals of at least one of the first emulation resources to terminals of at least one of the second emulation resources.

39. The apparatus in accordance with claim 29 wherein the first transaction device also monitors output signals appearing at terminals of at least one of the first emulation resources, and wherein the apparatus further comprises:
a plurality of second emulation resources, each having a plurality of terminals, each for emulating a separate component of the electronic equipment by generating output signals at its output terminals in response to input signals applied to its input terminals, and each having a unique network address; and
a second transaction device connected for receiving packets conveyed via the packet routing network, connected to terminals of each of the second emulation resources for transmitting input signals to the second emulation resources,
wherein the first transaction device monitors states of at least one output signal appearing at least one of the terminals of at least one of the first emulation resources, transmits a packet via the packet routing network identifying one of the second emulation resources by its network address, identifying a separate input signal of the identified second emulation resource corresponding to each monitored first emulation resource output signal, and causes the second transaction device to drive each of identified second emulation resource input signals to a state determined in accordance with a state of its corresponding first emulation resource output signal.

40. The apparatus in accordance with claim 29 further comprising:
a circuit board containing electronic equipment;
a socket for holding an integrated circuit mounted on the circuit board, wherein the circuit board provides signal communication paths between the socket and the electronic equipment; and
means for providing signal communication paths between the socket and terminals of at least one of the first emulation resources.

41. The apparatus in accordance with claim 29
wherein the first emulation resources comprise a plurality of field programmable gate arrays (FPGAs), each having terminals for receiving input signals and transmitting output signals, wherein logical relationships between the output signals and the input signals are controlled by programming data supplied to programming inputs of the FPGAs,
wherein one of the packets received by the first transaction device circuit contains clock signal routing control data,
wherein the first transaction device [circuit] generates edges of at least one first clock signal in response to packets received via the transaction device, and
wherein the first transaction device comprises:
a clock signal generator for generating at least one second clock signal;
at least one terminal for receiving at least one externally generated third clock signal; and
a clock signal distribution system for routing ones of the first, second and third clock signals selected by the routing selection control data, to terminals of the FPGAs.

42. The apparatus in accordance with claim 29 wherein the first emulation resources comprise:
a plurality of field programmable gate arrays (FPGAs), each having terminals for receiving input signals and transmitting output signals, wherein logical relationships between the output signals and the input signals are controlled by programming data supplied to programming inputs of the FPGAs;
first signal paths linking terminals of each FPGA to terminals of every other FPGA; and
a plurality of random access memories (RAMs), each corresponding to a separate one of the FPGAs, each RAM being connected to terminals of its corresponding FPGA so that each RAM's corresponding FPGA cart write data to the RAM and read data from the RAM via signals and input signals of the corresponding FPGA.

43. The apparatus in accordance with claim 29 wherein the first transaction device comprises:
a random access memory (RAM); and
means for storing probe data indicating states of output signals of the first emulation resources and for reading the probe data out of the RAM and transmitting the probe data via a packet transmitted on the packet routing network.

44. The apparatus in accordance with claim 29
wherein the first emulation resources comprise a plurality of field programmable gate arrays (FPGAs), each having terminals for receiving input signals and transmitting output signals, wherein logical relationships between the output signals and the input signals are controlled by programming data supplied to programming inputs of the FPGAs, each FPGA including means for generating output state data indicating its current state, and for setting its current state to a state indicated by input state data; and
wherein the first transaction device comprises:
a random access memory (RAM); and
a memory controller for receiving output state data from each FPGA and storing it in the RAM and for reading state data stored in the RAM as input state data to the FPGAs.

45. An apparatus for emulating an electronic circuit device under test (DUT), the apparatus comprising:
a packet routing network for conveying packets; and
at least one resource board comprising
a printed circuit board (203);
a plurality of field programmable gate arrays (FPGAs) mounted on the PCB, each for emulating a separate portion of the DUT by receiving input signals and generating output signals, the PCB providing signal paths between the FPGAs; and
a transaction device mounted on the PCB for transmitting outgoing packets via the packet routing network indicating states of output signals of the FPGAs and for receiving incoming packets arriving via the packet routing network, and for driving input signals of the FPGAs to states indicated by data included the incoming packets wherein each FPGA is identified by a unique network address and wherein packets conveyed via the packet routing network include network addresses identifying individual FPGAs.

46. The apparatus in accordance with claim 45 wherein the transaction device of each resource board programs the FPGAs of that resource board by supplying them with programming data conveyed to the transaction device in packets arriving via the packet routing network.

47. The apparatus in accordance with claim 45
wherein at least one of the resource boards further comprises a memory, and
wherein the transaction device of that resource board writes data to the memory indicating states of output signals of the FPGAs on that resource board and then reads That data out of the memory and transmits it in a packet via the packet routing network.

48. The apparatus in accordance with claim 45
wherein at least one resource board further comprises a memory, and
wherein the transaction device of that resource board writes data to the memory contained in a packet arriving via the packet routing network, and then reads the data out of the memory and drives input signals of the FPGAs of that resource board to successive states controlled by the data read out of the memory.

49. The apparatus in accordance with claim 45 wherein at least one resource board further comprises a memory,
wherein the transaction device of that resource board repeatedly acquires state data from the FPGAs of that resource board and stores the state data in the memory,
wherein the state data fully defines current operating states of the FPGAs at a time the state data was acquired from the FPGAs,
wherein the transaction device of that resource board subsequently responds to a packet arriving via the packet routing network by reading the state data out of the memory and forwards it to the FPGAs, and
wherein the FPGAs respond to the state data received from the transaction devices by restoring themselves to states defined by the received state data.

50. The apparatus in accordance with claim 45 further comprising a computer for transmitting and receiving packets to and from the transaction device of each resource boards via the packet routing network.

51. The apparatus in accordance with claim 50 wherein the computer emulates a portion of the DUT by receiving packets via the packet routing network containing input data, by processing that input data to produce output data, and by transmitting that output data in packets outward on the packet routing network.

52. The apparatus in accordance with claim 50 wherein the transaction device of each resource board programs the FPGAs of that resource board by supplying them with programing data conveyed to the transaction device in packets transmitted to that resource board by the computer via the packet routing network.

53. The apparatus in accordance with claim 45 further comprising
a memory, and
means connected to the packet routing network for writing into the memory data conveyed in packets via on the packet routing network, and for reading data out of the memory and transmitting the read out data in packets via the packet routing network.

54. The apparatus in accordance with claim 45 wherein each resource board further comprises a plurality of memories mounted on the PCB, each corresponding to a separate one of the FPGAs, each memory being read and write accessed by its corresponding FPGA.

55. The apparatus in accordance with claim 45 wherein the transaction device of at least one resource board generates pulses of a clock signal in response to packets transmitted via the packet routing network and supplies the clock signal as input to at least one FPGA for clocking logic devices within that FPGA.

56. The apparatus in accordance with claim 45
wherein the transaction device of at least one resource board generates pulses of a first clock signal in response to packets transmitted via the packet routing network, wherein the at least one resource board further comprises a source of second clock signal, and wherein the transaction device of the at least one resource board selects one of the first and second clock signals in response to data included in a packet arriving via the packet routing network and supplies it as input to at least one FPGA for clocking logic devices within that FPGA.

57. The apparatus in accordance with claim 45 wherein at least one of the resource boards further comprises a memory, and wherein the transaction device of that resource board comprises means for writing data to the memory indicating states of output signals of the FPGAs on that resource board, for writing data to the memory contained in packets arriving via the packet routing network, for forwarding data contained in the memory in packets conveyed by the packet routing network, and for driving input signals of the FPGAs of that resource board to successive states controlled by the data stored in the first memory.

58. The apparatus in accordance with claim 45 wherein each resource board further comprises a memory, wherein the transaction device of each resource board repeatedly acquires a block of state data from each FPGA of that resource board fully defining the FPGA's current operating state at a time the block of state data is acquired, wherein the transaction device stores each acquired block of state data in the memory and thereafter reads one of blocks of state data out of the memory and forwards them to the FPGAs, and wherein the FPGAs respond to the blocks of state data forwarded by the transaction device by restoring themselves to states defined by the forwarded blocks of state data.

59. The apparatus in accordance with claim 57 further comprising a computer for transmitting and receiving packets to and from the resource boards the packet routing network wherein the computer emulates a portion of the electronic device by receiving packets via the packet routing network containing input data, by processing that input data to produce output data, and by transmitting that output data in packets outward on the packet routing network, and wherein the transaction device of each resource board programs the FPGAs of that resource board by supplying them with programming data conveyed to the transaction device in packets transmitted to that resource board by the computer via the packet routing network.

60. The apparatus in accordance with claim 59 wherein at least one resource board further comprises a plurality of memories, each corresponding to a separate one of the FPGAs of that resource board, each memory being read and write accessed by its corresponding FPGA.

61. The apparatus in accordance with claim 59, wherein the transaction device of at least one resource board generates pulses of a first clock signal in response to packets transmitted via the packet routing network, wherein the at least one resource board further comprises a source of second clock signal, and wherein the transaction device of the at least one resource board selects one of the first and second clock signals in response to data included in a packet arriving via the packet routing network and supplies it as input to at least one FPGA for clocking logic devices within that FPGA.

62. The apparatus in accordance with claim 50 wherein the computer emulates test equipment supplying test signals as input to the DUT by transmitting commands to the transaction device of at least one resource board via packets conveyed by the packet routing network, and wherein the transaction device of the at least one resource boards executes each command conveyed in a packet by driving at least one input signal to at least one FPGA of that resource board to a particular state indicated by data conveyed in the packet with the command.

63. The apparatus in accordance with claim 50 wherein the computer emulates test equipment monitoring output signals of the DUT by transmitting commands to the transaction device of each resource board via packets conveyed by the packet routing network, and wherein at least one of the transaction devices executes each command by storing data indicating a state of at Least one output signal of at least one FPGA of that resource board.

64. An apparatus for emulating a test bench, the apparatus comprising:

a packet routing network for conveying packets;

a plurality of emulation resources, each having inputs and outputs and each emulating a separate first portion of the testbench by receiving and processing input data at its inputs to produce output data at its outputs, wherein inputs and outputs of the emulation resources are mapped to separate addresses within a memory address space;

a transaction device connected to the packet routing network and connected to the emulation resources for supplying input, data to emulation resource's inputs and monitoring output data produced at the emulation resource's outputs; and a first computer connected to the packet routing network and running first emulation software emulating a second portion of the testbench by executing read instructions for reading input data from addresses of the memory addresses, processing the input data read from addresses of the memory space to produce output data and executing write instructions for writing output data it produces to addresses of the memory space, wherein when the first emulation software executes a write instruction for writing first data to a first memory space address to which an emulation resource input is mapped, the first computer sends a first packet conveying the first data to the transaction device via the packet routing network and the transaction device responds to the first packet by supplying the first data as input data to the emulation resource input mapped to the first memory space address.

65. The apparatus in accordance with claim 64 wherein when the first emulation software executes a read instruction for reading second data from a second memory space address to which an emulation resource output is mapped, the first computer sends a second packet to the transaction device via the packet routing network and the transaction device responds to the second packet by transmitting another packet to the first computer conveying output data produced at the emulation resource output mapped to the second memory space address.

66. The apparatus in accordance with claim 64
wherein the emulation resources include storage locations write accessed by the transaction device, each storage location being mapped to a separate address within the memory space,
wherein when the emulation software executes a write instruction for writing a third data to a third memory space address to which an emulation resource storage location is mapped, the first computer sends a third packet conveying the third data to the transaction device via the packet routing network and the transaction device responds to the third packet by supplying the third data as input data to the emulation resource storage address mapped to the third memory space address.

67. The apparatus in accordance with claim 64,
wherein the emulation resources include storage locations read accessed by the transaction device, each storage location being mapped to a separate address within the memory space,
wherein when the emulation software executes a read instruction for reading fourth data from a fourth memory space address to which an emulation resource storage location is mapped, the first computer sends a fourth packet to the transaction device via the packet routing network and the transaction device responds to the fourth packet by transmitting another packet to the first computer conveying data stored in the emulation resource storage location mapped to the fourth memory space address.

68. The apparatus in accordance with claim 64 wherein the transaction device comprises:

a memory; and emulation means for emulating a third portion of the testbench by reading data from addresses of the memory space and storing the data in its memory, or by reading data out of the memory and writing it to addresses of the memory space.

69. The apparatus in accordance with claim 68 wherein the emulation means comprises a computer processor executing instructions stored in the memory.

* * * * *